(12) United States Patent
Adema et al.

(10) Patent No.: US 10,859,837 B2
(45) Date of Patent: Dec. 8, 2020

(54) OPTICAL COMBINER LENS FOR WEARABLE HEADS-UP DISPLAY

(71) Applicant: Google LLC, Mountain View, CA (US)

(72) Inventors: Daniel Robert Adema, Kitchener (CA); Timothy Paul Bodiya, Toronto (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/576,322

(22) Filed: Sep. 19, 2019

(65) Prior Publication Data
US 2020/0096772 A1 Mar. 26, 2020

Related U.S. Application Data

(60) Provisional application No. 62/734,798, filed on Sep. 21, 2018.

(51) Int. Cl.
*G02B 27/01* (2006.01)
*F21V 8/00* (2006.01)

(52) U.S. Cl.
CPC ......... *G02B 27/0172* (2013.01); *G02B 6/005* (2013.01); *G02B 6/0016* (2013.01); *G02B 6/0035* (2013.01); *G02B 2027/0174* (2013.01); *G02B 2027/0178* (2013.01)

(58) Field of Classification Search
CPC ........................... G02B 6/0035; G02B 6/0016
See application file for complete search history.

(56) References Cited

U.S. PATENT DOCUMENTS

| | | | |
|---|---|---|---|
| 10,007,119 B2* | 6/2018 | Dobschal | G02B 27/0172 |
| 10,429,646 B2* | 10/2019 | Kress | G02B 27/0172 |
| 2007/0070859 A1* | 3/2007 | Hirayama | G02B 5/32 369/112.04 |
| 2014/0063853 A1 | 3/2014 | Nichol et al. | |
| 2017/0045742 A1* | 2/2017 | Greenhalgh | G02B 27/0172 |
| 2017/0248750 A1 | 8/2017 | Curtis et al. | |
| 2018/0128451 A1 | 5/2018 | Adema et al. | |
| 2019/0278086 A1* | 9/2019 | Ofir | G02B 27/0172 |
| 2019/0346918 A1* | 11/2019 | Akkaya | G02B 27/0075 |
| 2019/0377122 A1* | 12/2019 | Danziger | G02B 3/10 |
| 2020/0049996 A1* | 2/2020 | Yan | G02F 1/13306 |
| 2020/0088995 A1* | 3/2020 | Leportier | G02B 6/12 |
| 2020/0089001 A1* | 3/2020 | Amitai | G02B 27/0172 |

\* cited by examiner

*Primary Examiner* — Sung H Pak

(57) ABSTRACT

An optical combiner lens for a wearable heads-up display includes a first lens, a second lens, and a lightguide disposed between the first lens and the second lens to form a stack. A first medium gap is defined within the stack and between the first lens and the lightguide, and a second medium gap is defined within the stack and between the lightguide and the second lens. An in-coupler is positioned to receive light into the lightguide. An out-coupler is positioned to output light from the lightguide.

20 Claims, 19 Drawing Sheets

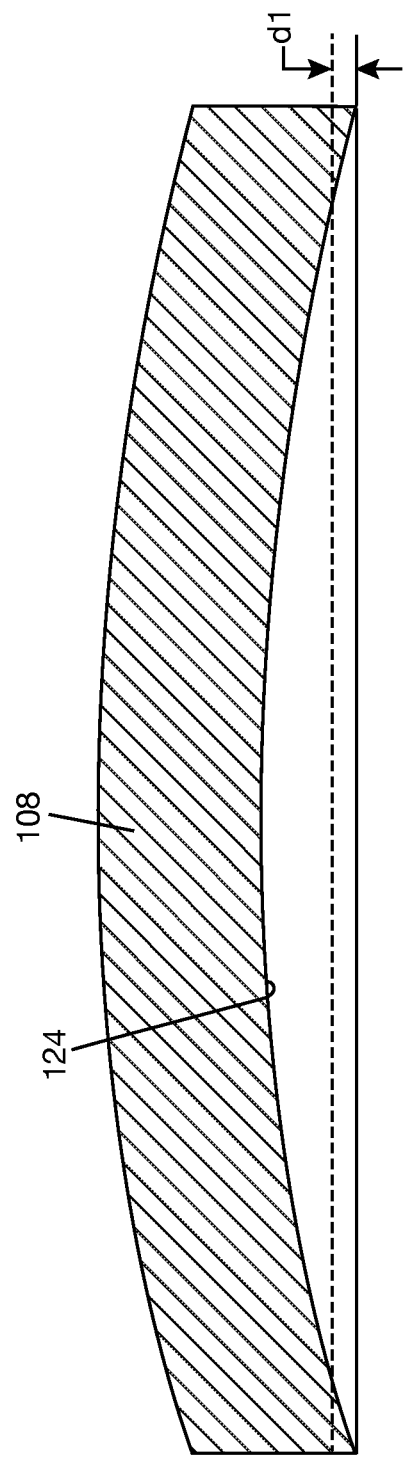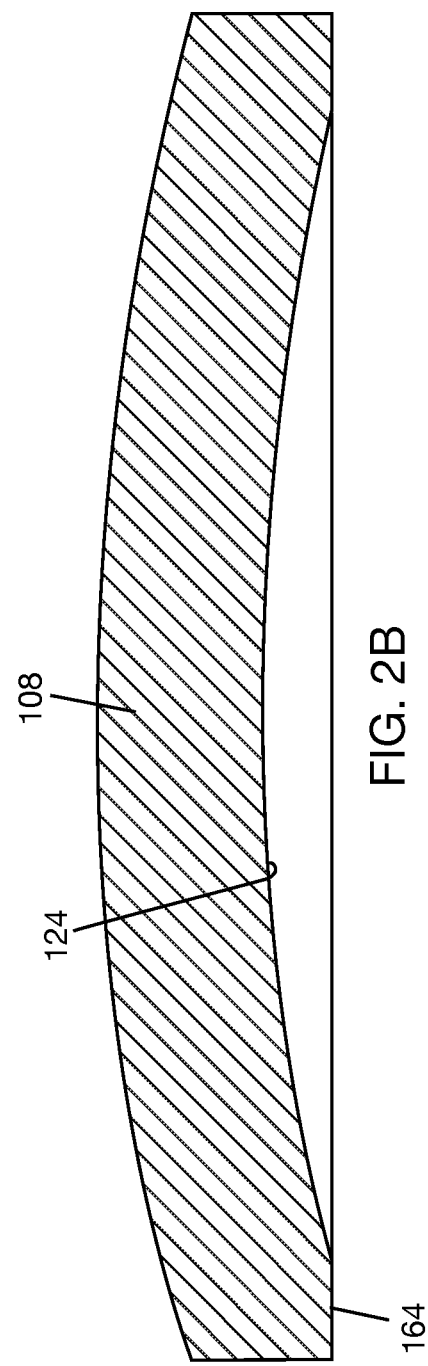

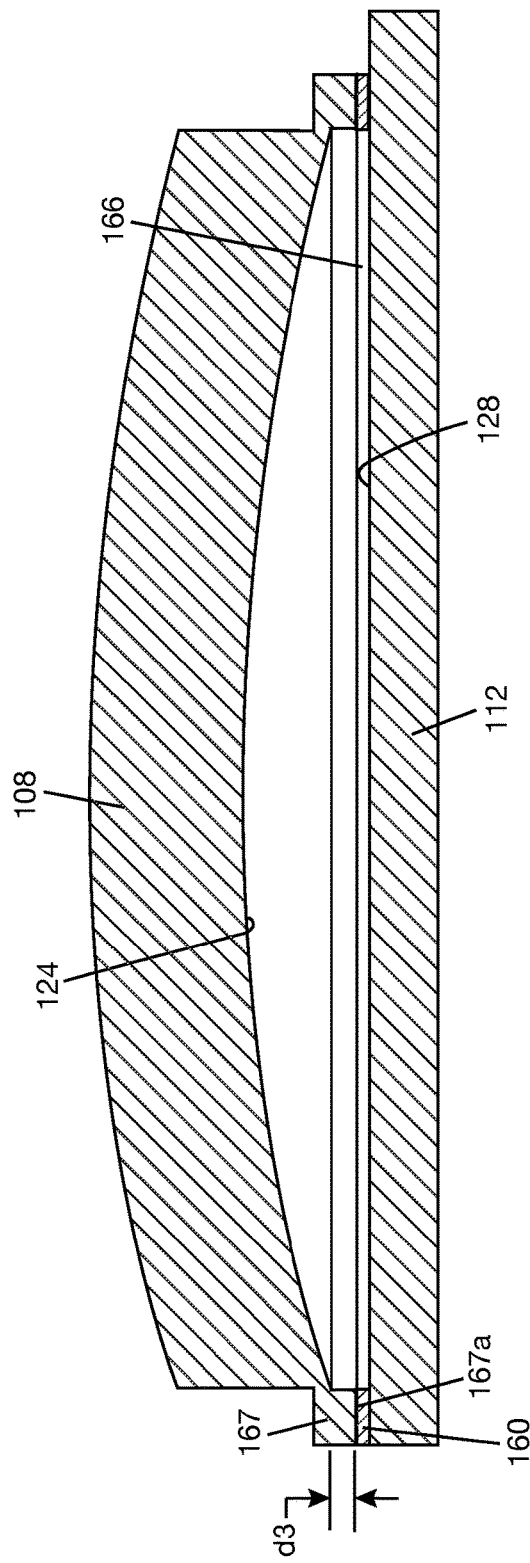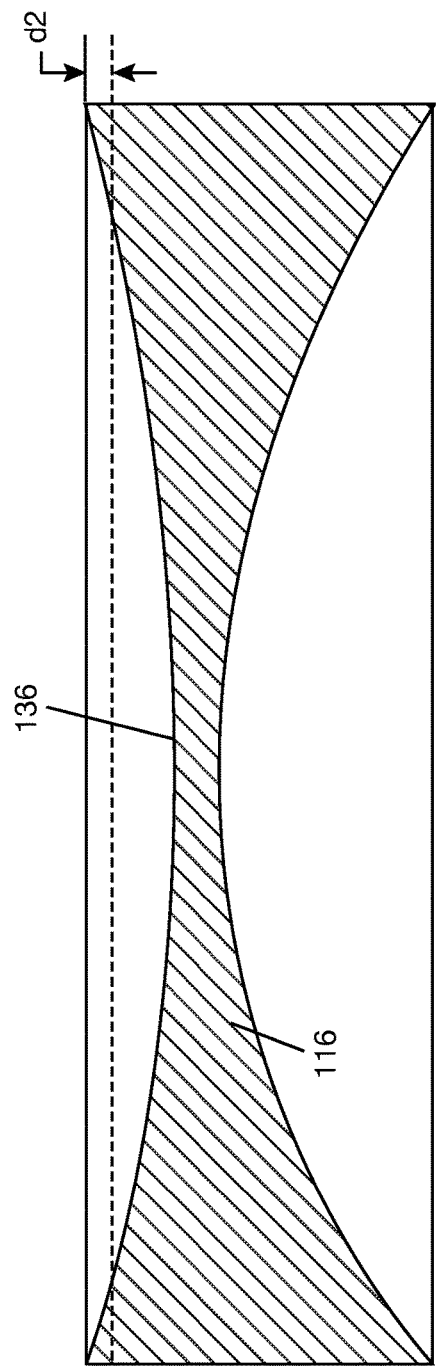

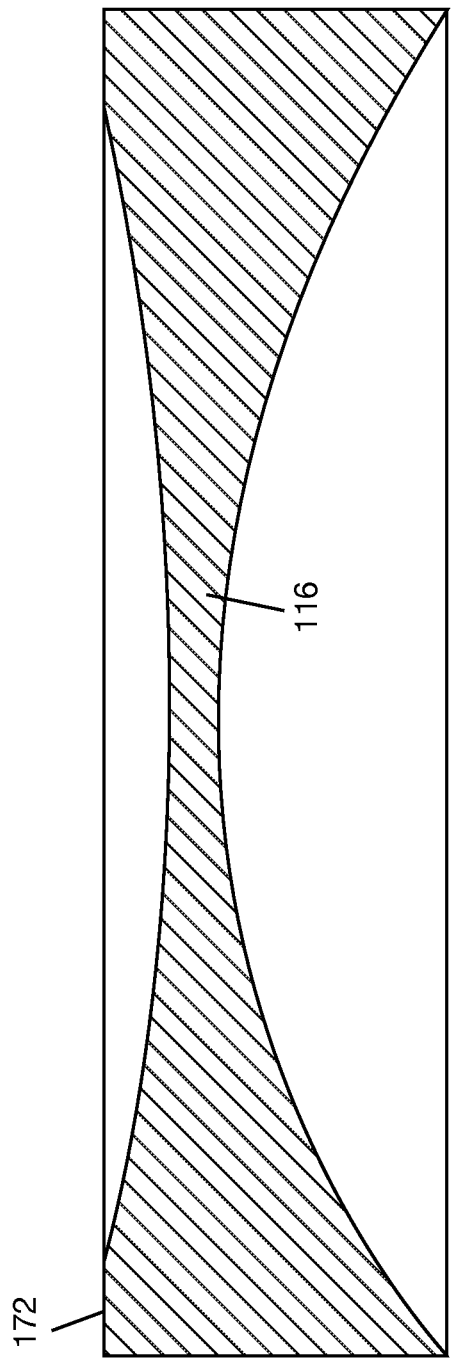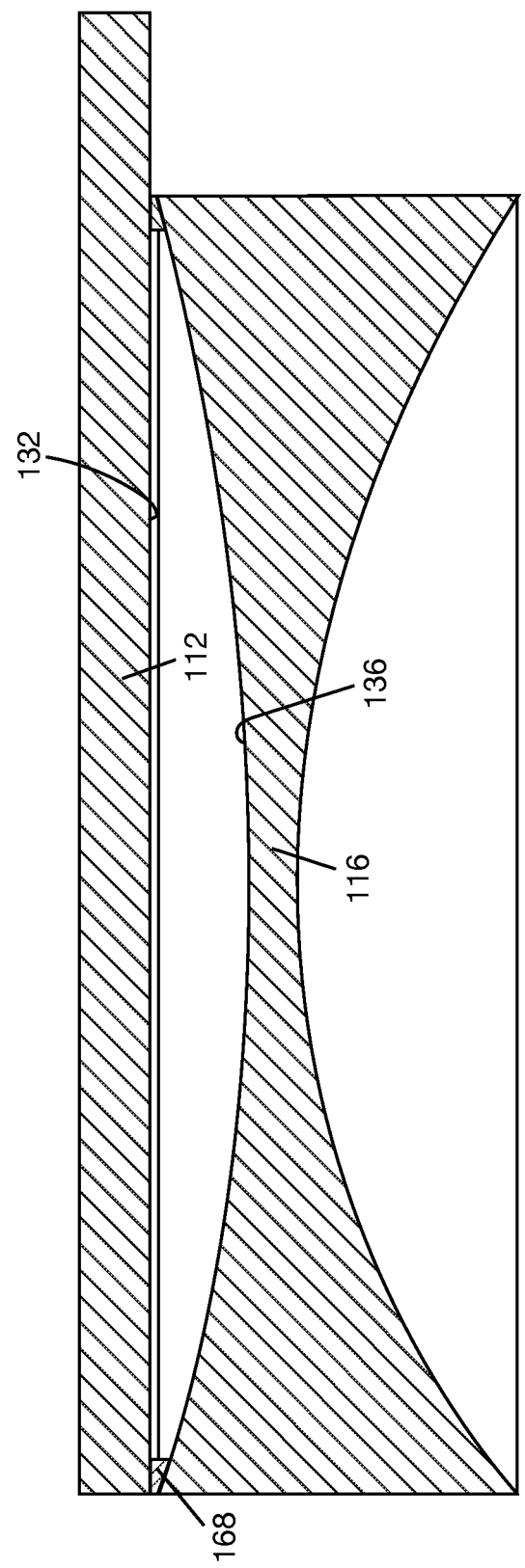

OPTICAL COMBINER LENS FOR WEARABLE HEADS-UP DISPLAY

CROSS-REFERENCE TO RELATED APPLICATIONS

This application claims the benefit of U.S. Provisional Application No. 62/734,798, filed 21 Sep. 2018, titled "Optical Combiner Lens for Wearable Heads-Up Display", the content of which is incorporated herein in its entirety by reference.

TECHNICAL FIELD

The disclosure relates generally to substrate-guided combiners and particularly to integration of substrate-guided combiners in lenses and use of such combiner lenses in wearable heads-up displays.

BACKGROUND

Wearable heads-up displays use optical combiners to combine real world and virtual images. There are two main classes of optical combiners used in wearable heads-up displays: free-space combiners and substrate-guided combiners. Holographic combiners are examples of free-space combiners, and lightguide (or waveguide) combiners are examples of substrate-guided combiners. Holographic combiners use one or more holograms to redirect light from a light source to a target. In lightguide combiners, light enters the lightguide, typically through an in-coupling element, propagates along the length of the lightguide by total internal reflection, and exits the lightguide, typically through an out-coupling element. In wearable heads-up displays having the form of eyeglasses, the optical combiners are integrated into at least one lens that is fitted in a support frame, where the at least one lens may or may not be a prescription lens. For a wearable heads-up display that is intended to be worn on the head for prolonged periods, it is desirable that the combiner-lens integration is lightweight while providing any desired prescription.

SUMMARY

An optical combiner lens may be summarized as including a first lens, a second lens, a lightguide in stack with the first lens and the second lens, an in-coupler positioned to receive light into the lightguide, an out-coupler positioned to output light from the lightguide, a first medium gap defined within the stack and between the first lens and the lightguide, and a second medium gap defined within the stack and between the lightguide and the second lens.

The first lens may be a meniscus lens or a planoconvex lens. The second lens may be a biconcave lens, a planoconcave lens, or a meniscus lens. The lightguide may be a planar lightguide. In some cases, the lightguide may be a curved lightguide.

Each of the first medium gap and the second medium gap may contain a respective medium having a refractive index that is lower than a refractive index of the lightguide.

The first lens may have a first lens inner surface that is convex or planar, with the first medium gap defined between the first lens inner surface and the lightguide. An adhesive layer may be disposed between the first lens and the lightguide. The adhesive layer may be in the form of a loop running along a periphery of the first lens inner surface. The adhesive layer may provide a hermetic seal around the first medium gap.

The second lens may have a second lens inner surface that is convex, planar, or concave, with the second medium gap defined between the second lens inner surface and the lightguide. An adhesive layer may be disposed between the second lens and the lightguide. The adhesive layer may be in the form of a loop running along a periphery of the second lens inner surface. The adhesive layer may provide a hermetic seal around the second medium gap.

The optical combiner lens may include an edge support structure to hold the first lens, the lightguide, and the second lens in a spaced apart relation in the stack. The edge support structure may circumscribe a periphery of the stack and seal the first and second medium gaps at the periphery of the stack. The edge support structure may be integrated with the first lens.

The first lens may be a meniscus lens having an optical power of zero.

The first lens may have an optical power that is zero, positive, or negative.

The second lens may have an optical power that is zero, positive, or negative.

The first lens and the out-coupler may have a combined optical power that is positive or negative.

The in-coupler may be physically coupled to an input area of the lightguide that is not in registration with the first lens and the second lens.

The optical combiner lens may include an infrared hologram in the stack. The infrared hologram may be carried by the second lens.

Each of the in-coupler and the out-coupler may include at least one of a hologram, a volume diffraction grating, and a surface relief grating. Each of the in-coupler and the out-coupler may be a transmission grating or a reflection grating.

A wearable heads-up display may be summarized as including a support structure, a display light source coupled to the support structure, and an optical combiner lens as summarized above. Each of the first lens and out-coupler of the optical combiner lens may have an optical power that is selected to position a display from the display light source at a select focal distance. The second lens of the optical combiner lens may have an optical power that is based on an eyeglasses prescription. The display light source may be a projector, a scanning laser projector, or a microdisplay.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIG. 2A is a cross-sectional view of a meniscus lens illustrating forming of a flat peripheral portion on an inner concave surface of the meniscus lens.

FIG. 2B is a cross-sectional view of the meniscus lens of FIG. 2A showing a flat peripheral surface extending radially of a concave surface of the meniscus lens.

FIG. 2E is a cross-sectional view of a meniscus lens with a stepped flange and an adhesive layer formed between the stepped flange and a planar lightguide.

FIG. 3A is a cross-sectional view of a biconcave lens illustrating forming of a flat peripheral portion on an inner concave surface of the biconcave lens.

FIG. 3B is a cross-sectional view of the biconcave lens of FIG. 3A showing a flat peripheral surface extending radially of a concave surface of the biconcave lens.

FIG. 3C is a cross-sectional view of an adhesive layer of varying thickness formed between a biconcave lens and a planar lightguide.

DETAILED DESCRIPTION

Figure 1A:
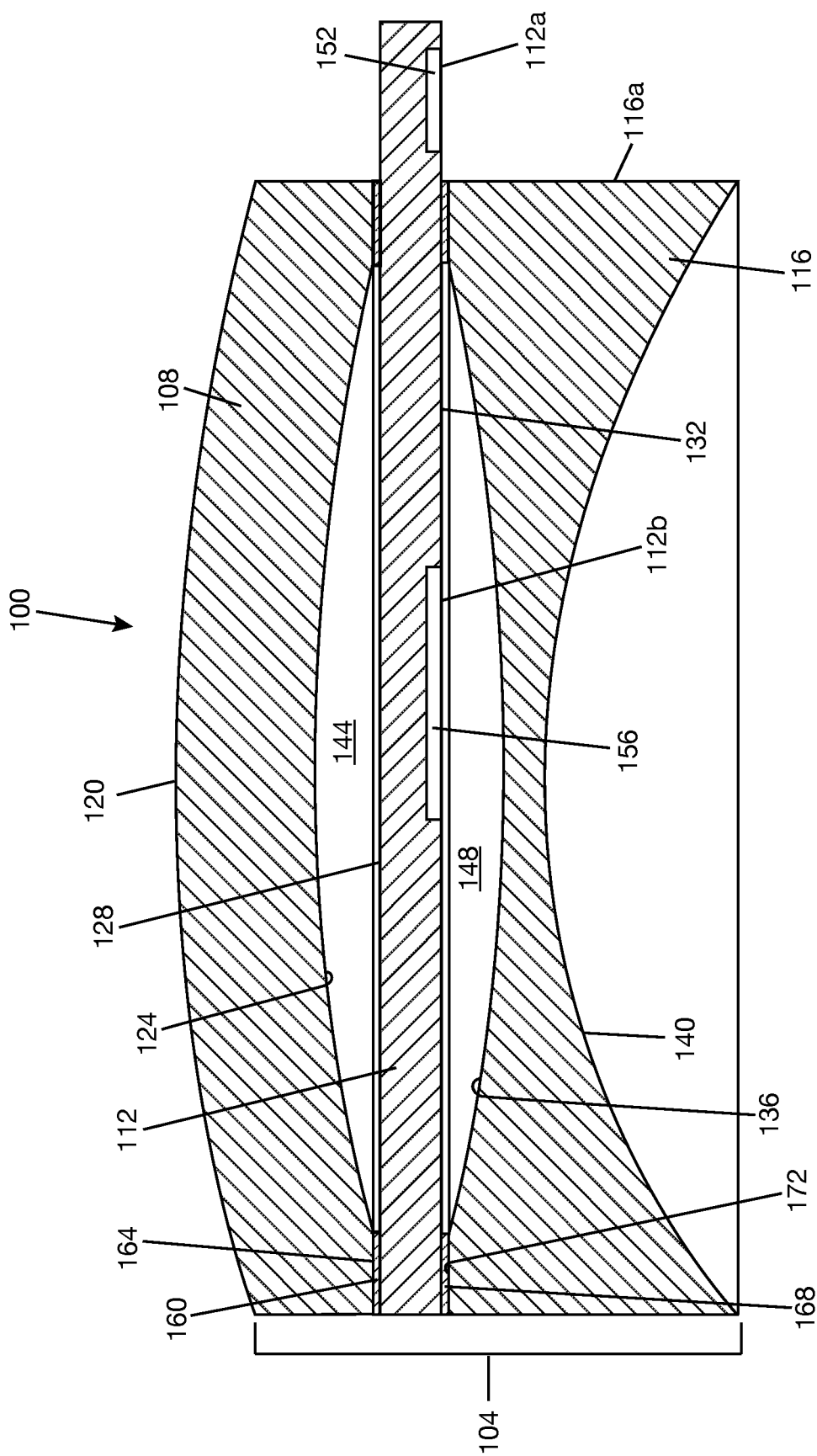
FIG. 1A is a cross-sectional view of an optical combiner lens including a meniscus lens, a planar lightguide, and a biconcave lens according to one illustrative implementation.

In the following description, certain specific details are set forth in order to provide a thorough understanding of various disclosed implementations and embodiments. However, one skilled in the relevant art will recognize that implementations and embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the implementations or embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure are for convenience only and do not interpret the scope or meaning of the embodiments.

FIG. 1A shows an optical combiner lens 100 according to one illustrative implementation. Optical combiner lens 100 includes a stack 104 composed of a first lens 108, a lightguide 112, and a second lens 116. Lightguide 112 is disposed between first lens 108 and second lens 116. In the illustrated example, lightguide 112 extends across a full width of the first lens 108 and second lens. In the illustrated example, an input area 112 of lightguide extends past the full width of first lens 108 and second lens 116 (i.e., input area 112a is not in registration with first lens 108 and second lens 116). In the illustrated example, first lens 108 is a meniscus lens having an outer convex surface 120 and an inner concave surface 124. Surfaces 120, 124 of first meniscus lens 108 are separated by the respective lens thickness. Lightguide 112 has a top lightguide surface 128 and a bottom lightguide surface 132. In the illustrated example, second lens 116 is a biconcave lens having an inner concave surface 136 and an outer concave surface 140. Surfaces 136, 140 of second biconcave lens 116 are separated by the respective lens thickness.

Outer convex surface 120 of first meniscus lens 108 may be the world side of optical combiner lens 100, and outer concave surface 140 of second biconcave lens 116 may be the eye side of optical combiner lens 100. Inner concave surface 124 of first meniscus lens 108 is in opposing relation to top lightguide surface 128. Inner concave surface 124 and top lightguide surface 128 define a first medium gap 144 within stack 104. The term "medium gap" refers to a gap or cavity or space that may contain a medium, which may be a gaseous material, a liquid material, or a solid material. Inner concave surface 136 of second biconcave lens 116 is in opposing relation to bottom lightguide surface 132. Inner concave surface 136 and bottom lightguide surface 132 define a second medium gap 148 within stack 104. In one implementation, each of medium gaps 144, 148 is hermetically sealed. The seal may be formed at or proximate a periphery of stack 104.

The term "lightguide," as used herein, will be understood to mean a combiner using total internal reflection (TIR) to transfer collimated light. For display applications, the collimated light may be a collimated image, and the lightguide transfers and replicates the collimated image to the eye. The light propagating through lightguide 112 may be visible light (e.g., including any combination of red light, green light, and blue light). In some cases, the light propagating through lightguide 112 may also include infrared light. In one example, lightguide 112 is an optical substrate that transmits light. In one implementation, each of medium gaps 144, 148 contains a medium with an index of refraction that is substantially different from that of lightguide 112, allowing light to travel along lightguide 112 by TIR. In one example, the medium in each of medium gaps 144, 148 is air. In other examples, the medium in each of medium gaps 144, 148 may be other gaseous material besides air, such as nitrogen. In yet other examples, the medium in each of medium gaps 144, 148 may be a liquid material, an oil, an adhesive material, or an optical material. The media in medium gaps 144, 148 may be the same or may be different. In other examples, lightguide 112 may be a dielectric waveguide including a core between two claddings, where the core has a higher refractive index compared to the claddings and light propagates within the core. In the illustrated example, lightguide 112 is a planar lightguide (i.e., has a planar or rectilinear geometry). Alternatively, lightguide 112 may be a curved lightguide, where at least one of the lightguide surfaces 128, 132 is a curved surface (i.e., not lying flat or not in a plane).

An in-coupler 152 is provided in input area 112a of lightguide 112 to couple light into lightguide 112. In general, the term "coupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, and/or surface relief holograms. A coupler may be of the transmission type, meaning the coupler transmits light and applies designed optical function(s) to the light during the transmission, or of the reflection type, meaning the coupler reflects light and applies designed optical function(s) to the light during the reflection.

Figure 1B:
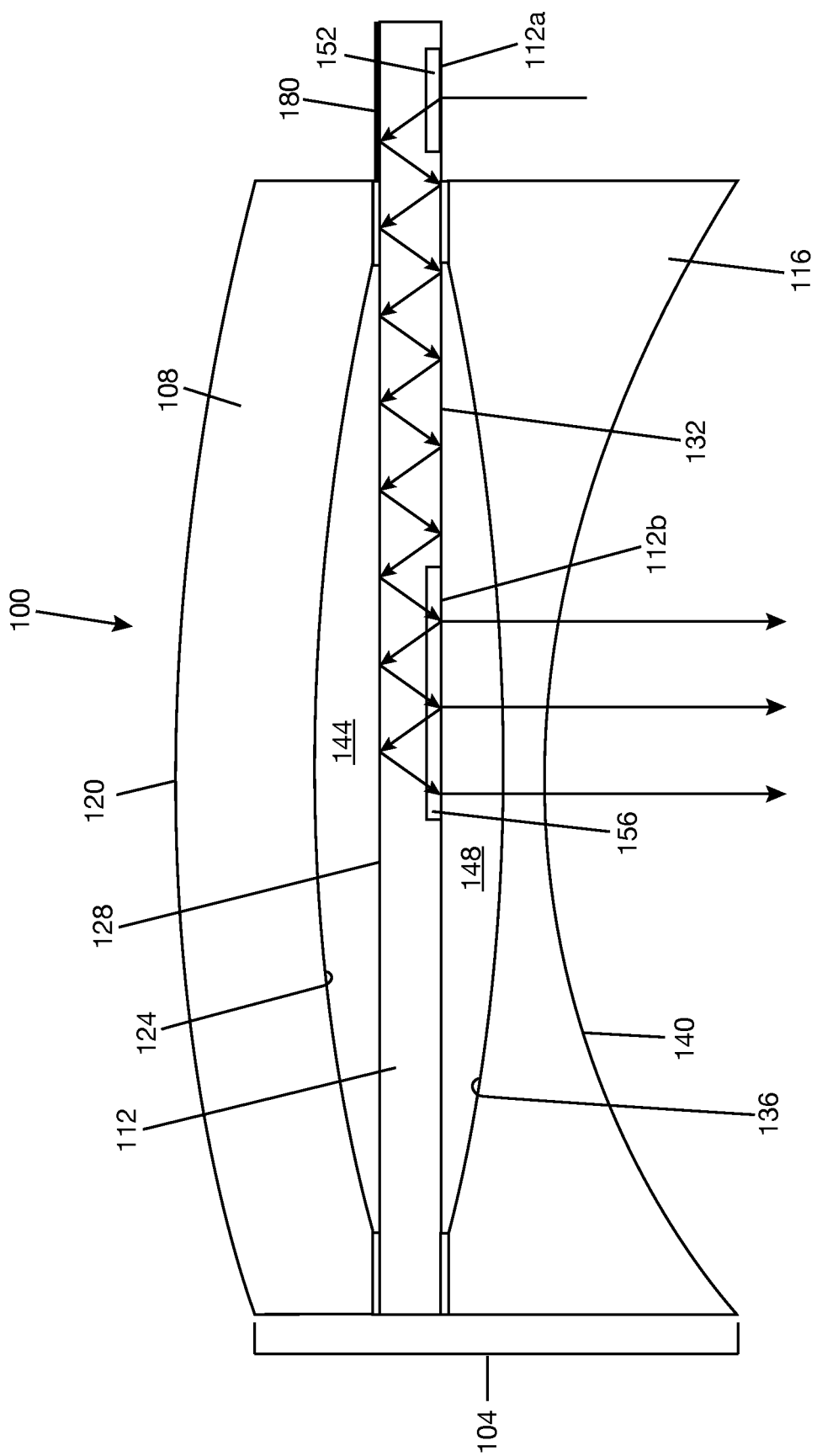
FIG. 1B is schematic view of the optical combiner lens of FIG. 1A showing light propagating through the planar lightguide.
Figure 1C:
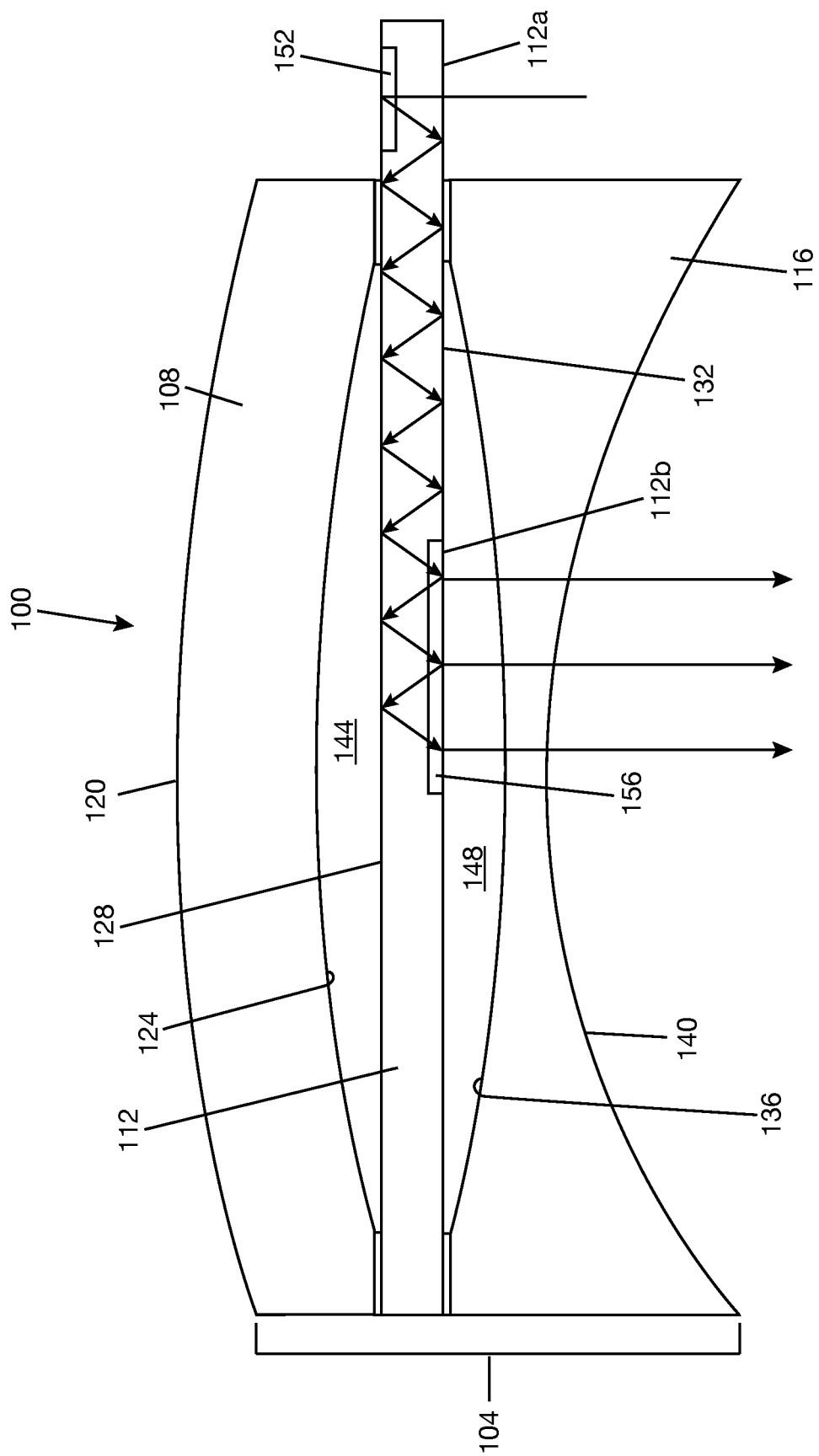
FIG. 1C is a variation of FIG. 1B showing an in-coupler as a reflection coupler.

FIG. 1B shows light traveling along lightguide 112 by TIR (FIG. 1B has been slightly simplified relative to FIG. 1A, e.g., cross-sectional hatches have been omitted, to avoid cluttering the drawing). In the example shown in FIG. 1B, in-coupler 152 is illustrated as a transmission coupler. If in-coupler 152 is a reflection coupler, in-coupler 152 would be positioned nearer the top of lightguide 112, where the coupler will be able to receive incoming light and reflect the light into the lightguide, as illustrated in FIG. 1C. An out-coupler 156 is provided in an output area 112b of lightguide 112. Output area 112b is in a portion of lightguide 112 that is in registration with second lens 116. Out-coupler 156 may be of the transmission type or the reflection type. In FIGS. 1B and 1C, out-coupler 156 is illustrated as a transmission coupler. However, out-coupler 152 could alternatively be a reflection coupler. FIG. 1C also shows that in-coupler 152 does not have to be the same type of coupler as out-coupler 156.

Figure 1D:
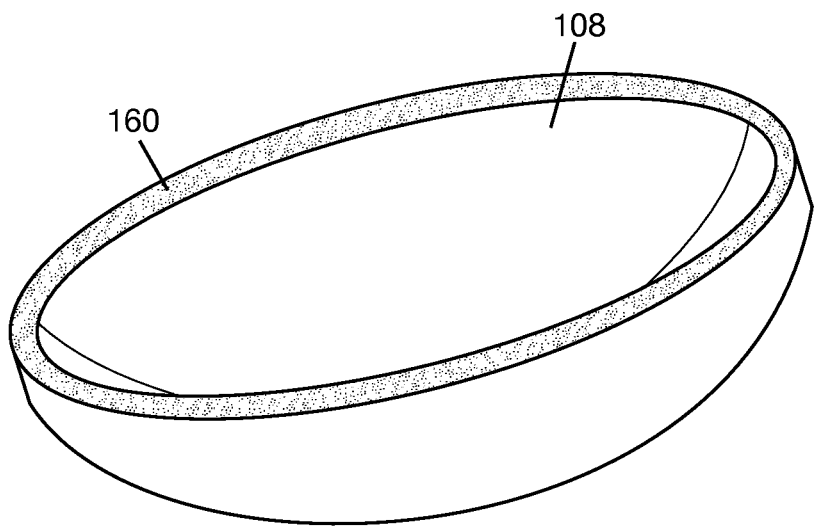
FIG. 1D is an isometric view of a meniscus lens with an adhesive loop running along a periphery of an inner concave surface of the meniscus lens.
Figure 2C:
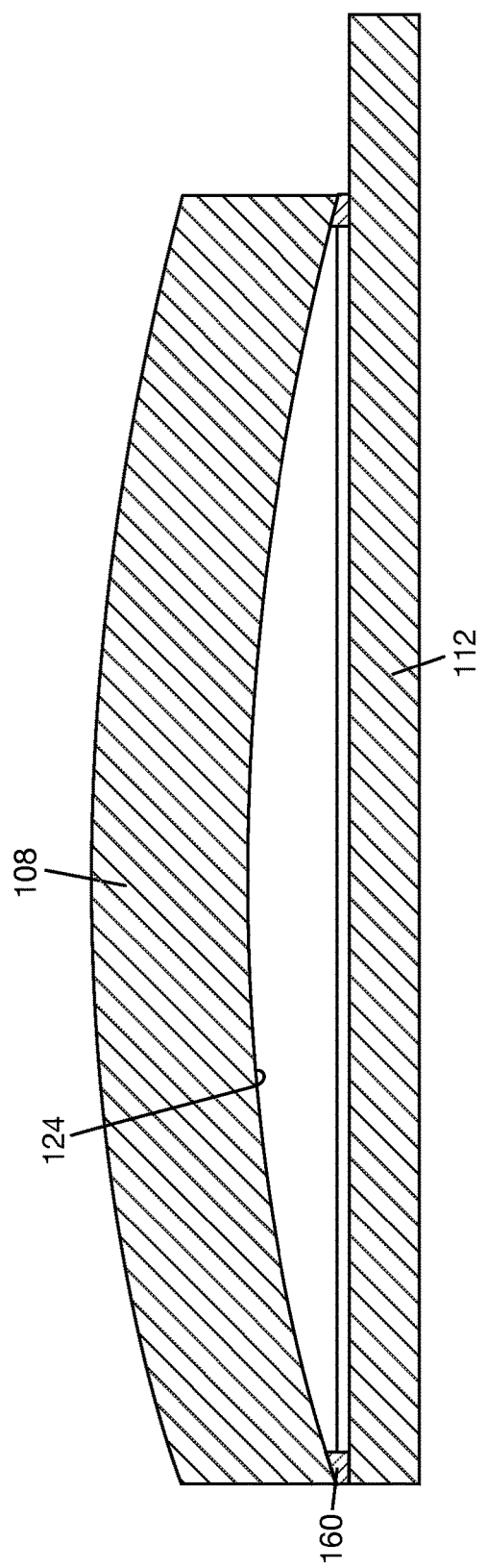
FIG. 2C is a cross-sectional view of an adhesive layer of varying thickness formed between a meniscus lens and a planar lightguide.

Returning to FIG. 1A, in one example, an adhesive layer 160 is disposed between first meniscus lens 108 and lightguide 112 to attach first meniscus lens 108 to lightguide 112. In one example, adhesive layer 160 is in the form of a loop running along a periphery of inner concave surface 124 of first meniscus lens 108, as shown in FIG. 1D. It should be understood that the lens shape shown in FIG. 1D is for illustrative purposes and is not intended to be limiting. Returning to FIG. 1A, in the example where adhesive layer 160 is a loop, adhesive layer 160 circumscribes a periphery of first medium gap 144, or closes first medium gap 144 at a periphery of stack 104. In one example, adhesive layer 160 has sealing properties and may prevent moisture and dust from entering first medium gap 144, thereby providing first medium gap 144 with a hermetic seal. In one example, a flat (or planar) peripheral surface 164 extends radially from a periphery of inner concave surface 124, and the adhesive layer 160 is formed between the flat peripheral surface 164 and the lightguide 112. As an example, one process for forming the flat peripheral surface 164 is to first form the meniscus lens 108, as shown in FIG. 2A, and then flat grind the concave side of meniscus lens 108 by some amount d1. FIG. 2B shows meniscus lens 108 after such grinding to include flat peripheral surface 164. In an alternative implementation, a flat peripheral surface may not extend radially from a periphery of inner concave surface 124, and adhesive layer 160 may be formed between a curved peripheral portion of inner concave surface 124 and the top lightguide surface 128, as illustrated in FIG. 2C. In this case, adhesive layer 160 will have a varying layer thickness, as shown in FIG. 2C.

Figure 2D:
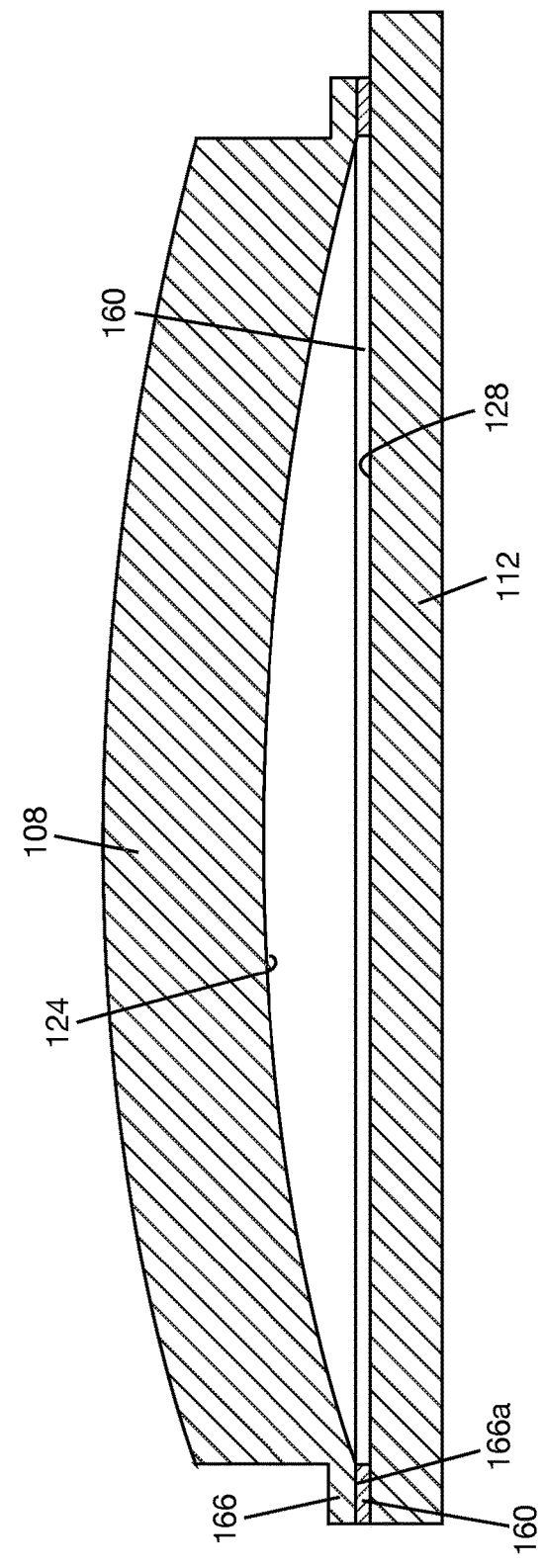
FIG. 2D is a cross-sectional view of a meniscus lens with a flange and an adhesive layer formed between the flange and a planar lightguide.

In another example, as shown in FIG. 2D, a flange 166 may be formed around the periphery of first meniscus lens 108. In this case, adhesive layer 160 may be formed between a flat (or planar) surface 166a of the flange 166 and top lightguide surface 128. In FIG. 2D, the flat surface 166a of flange 166 is level with the periphery of inner concave surface 124. FIG. 2E shows an example where a flange 167 formed around the periphery of first meniscus lens 108 has a flat surface 167a that is axially offset by a distance d3 relative to a periphery of inner concave surface 124. The example meniscus lenses with flanges shown in FIGS. 2D and 2E may be formed using special molds.

Figure 1E:
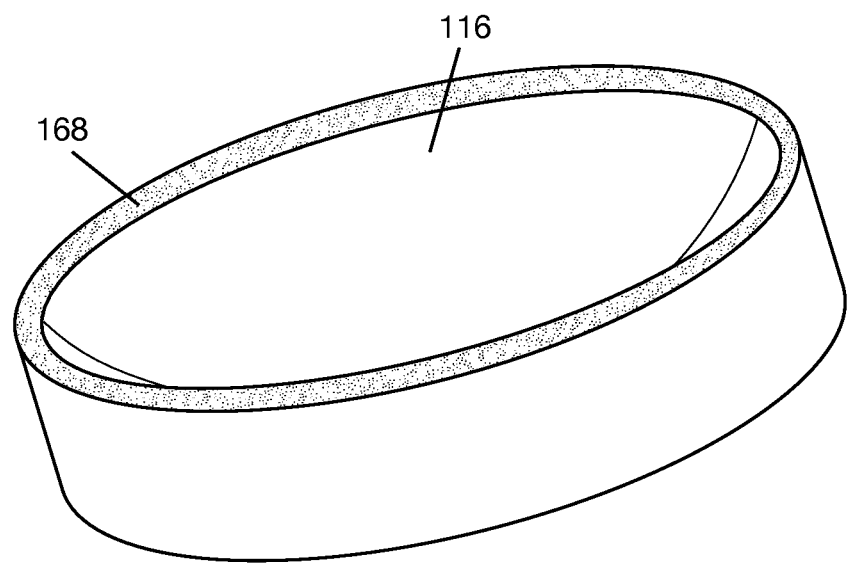
FIG. 1E is an isometric view of a biconcave lens with an adhesive loop running along a periphery of an inner concave surface of the biconcave lens.

Returning to FIG. 1A, in one example, an adhesive layer 168 is disposed between second biconcave lens 116 and lightguide 112 to attach second biconcave lens 116 to lightguide 112. In one example, adhesive layer 168 is in the form of a loop running along a periphery of inner concave surface 136 of second biconcave lens 116, as shown in FIG. 1E. It should be understood that the lens shape shown in FIG. 1E is for illustrative purposes and is not intended to be limiting. Returning to FIG. 1A, in the example where adhesive layer 168 is a loop, adhesive layer 168 circumscribes a periphery of second medium gap 148, or closes second medium gap 148 at a periphery of stack 104. In one example, adhesive layer 168 has sealing properties and may prevent moisture and dust from entering second medium gap 148, thereby hermetically sealing medium gap 148. In one example, a flat (or planar) peripheral surface 172 extends radially from a periphery of inner concave surface 136, and the adhesive layer 168 is formed between the flat peripheral surface 172 and the lightguide 112. As an example, one process for forming the flat peripheral surface 172 is to first form the biconcave lens 116, as shown in FIG. 3A, and then flat grind a concave side of biconcave lens 116 by some amount d2. FIG. 3B shows the biconcave lens after such grinding to include flat peripheral surface 172. In an alternative implementation, a flat peripheral surface may not extend radially from a periphery of inner concave surface 136, and adhesive layer 168 may be formed between a curved peripheral portion of inner concave surface 136 and the bottom lightguide surface 132, as illustrated in FIG. 3C. In this case, the adhesive layer 168 will have a varying layer thickness, as shown in FIG. 3C.

Figure 3D:
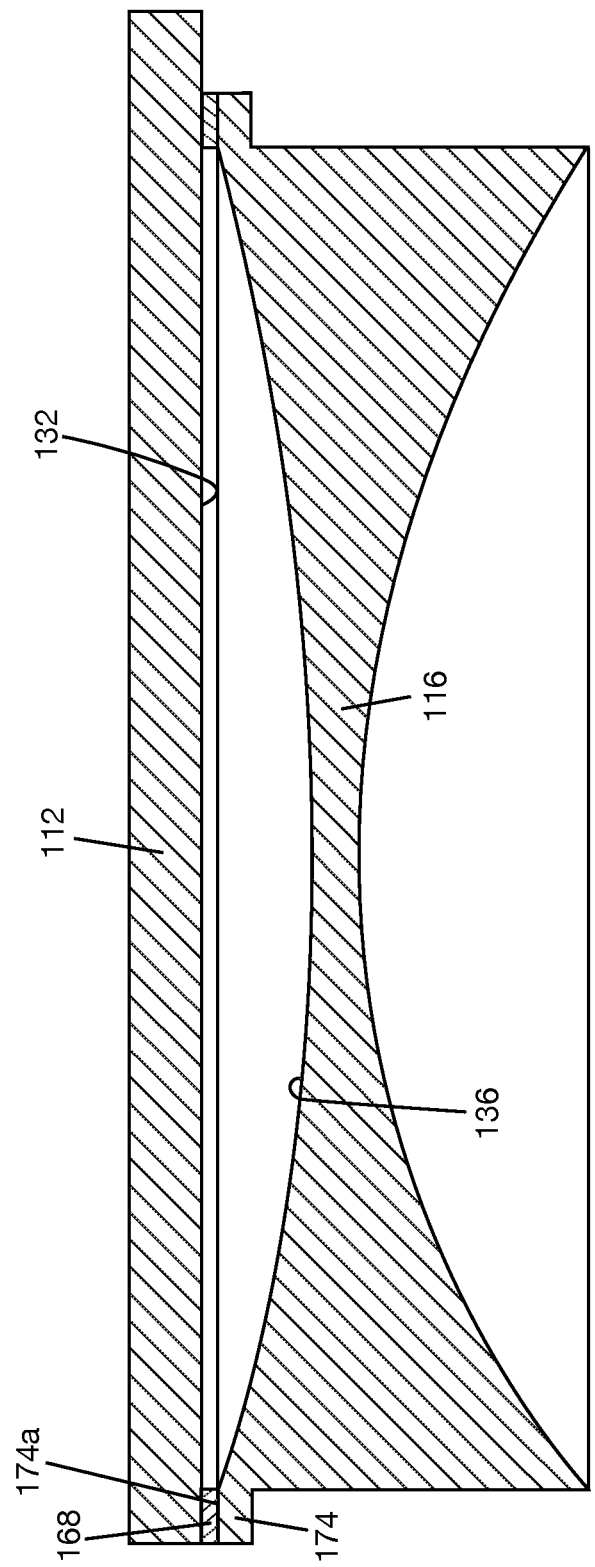
FIG. 3D is a cross-sectional view of a biconcave lens with a flange and an adhesive layer formed between the flange and the planar lightguide.
Figure 3E:
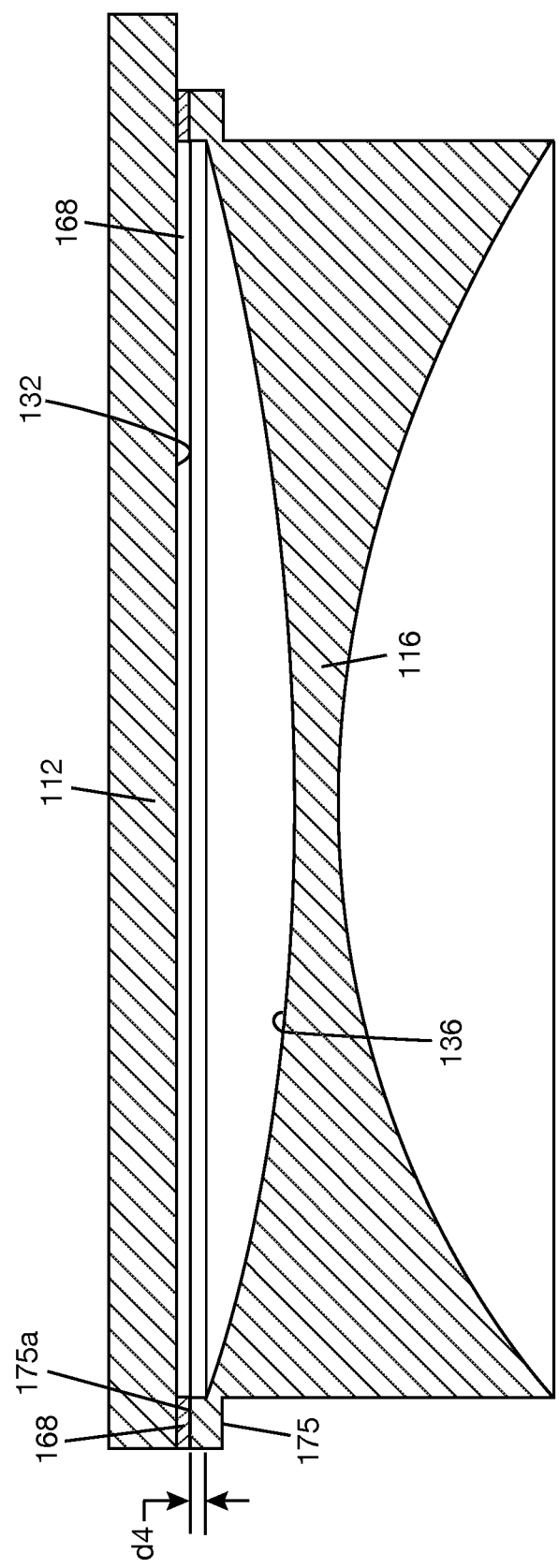
FIG. 3E is a cross-sectional view of a biconcave lens with an offset flange and an adhesive layer formed between the offset flange and a planar lightguide.

In another example, as shown in FIG. 3D, a flange 174 may be formed around the periphery of second biconcave lens 116. In this case, adhesive layer 168 may be formed between a flat (or planar) surface 174a of flange 174 and bottom lightguide surface 132. In FIG. 3D, the flat surface 174a of flange 174 is level with the periphery of inner concave surface 136. FIG. 3E shows an example where a flange 175 formed around the periphery of second biconcave lens 108 has a flat surface 175a that is axially offset by a distance d4 relative to the periphery of inner concave surface 136. The example biconcave lenses with flanges shown in FIGS. 3D and 3E may be formed with special molds.

Returning to FIG. 1A, in one implementation, first lens 108, second lens 116, and lightguide 112 are made of transparent materials, which would allow use of optical combiner lens 100 as an eyeglass. First lens 108 and second lens 116 may be made of any suitable lens material, such as plastic, e.g., polycarbonate, or glass. One or more coatings, such as anti-scratch coating, anti-reflective (AR) coating, and/or IR-blocking coating, may be applied to the outer surface 120 of first lens 108. In one example, at least AR coating is applied to the outer and inner surfaces of first lens 108 and second lens 116. Lightguide 112 may also be made of lens material, or material compatible with lens material, bearing in mind the refractive index requirements for lightguide 112 previously described.

In one implementation, at least out-coupler 156 is made of transparent material(s). In an alternative implementation, both out-coupler 156 and in-coupler 152 may be made of transparent material(s). Couplers 152, 156 may be physically coupled to lightguide 112 by adhering, or otherwise attaching, the couplers to the lightguide or by modifying portions of the lightguide to provide the optical coupling functions.

Coatings may be applied to lightguide 112 to enhance functionality of the lightguide. For example, as illustrated in FIG. 1B, a reflective coating 180 may be applied on a surface of lightguide 112 opposite in-coupler 152 to prevent loss of light through that surface.

Returning to FIG. 1A, the adhesive material in adhesive layers 160, 168 may be any adhesive material that is compatible with lens and lightguide materials. In some cases, the adhesive material may be optically transparent. Preferably, the adhesive material has sealing properties, e.g., nonporous material, so as to keep moisture and dust out of medium gaps 144, 148. In some cases, the adhesive material may be a UV curable resin with properties to adhere to the material of the lenses 108, 116 and lightguide 112.

Figure 4A:
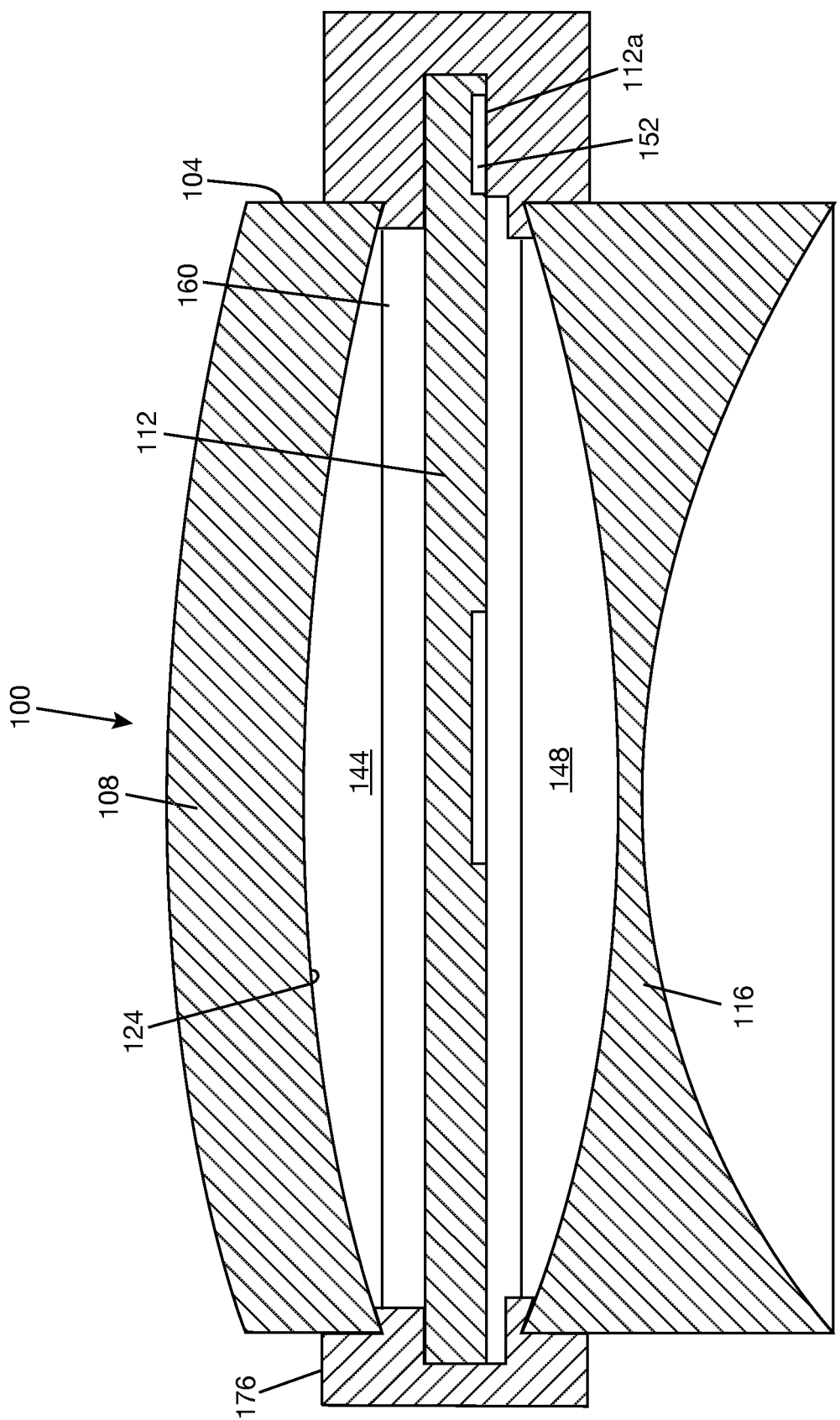
FIG. 4A is a cross-sectional view of an optical combiner lens including an edge support structure holding a stack of lenses and lightguide.
Figure 4B:
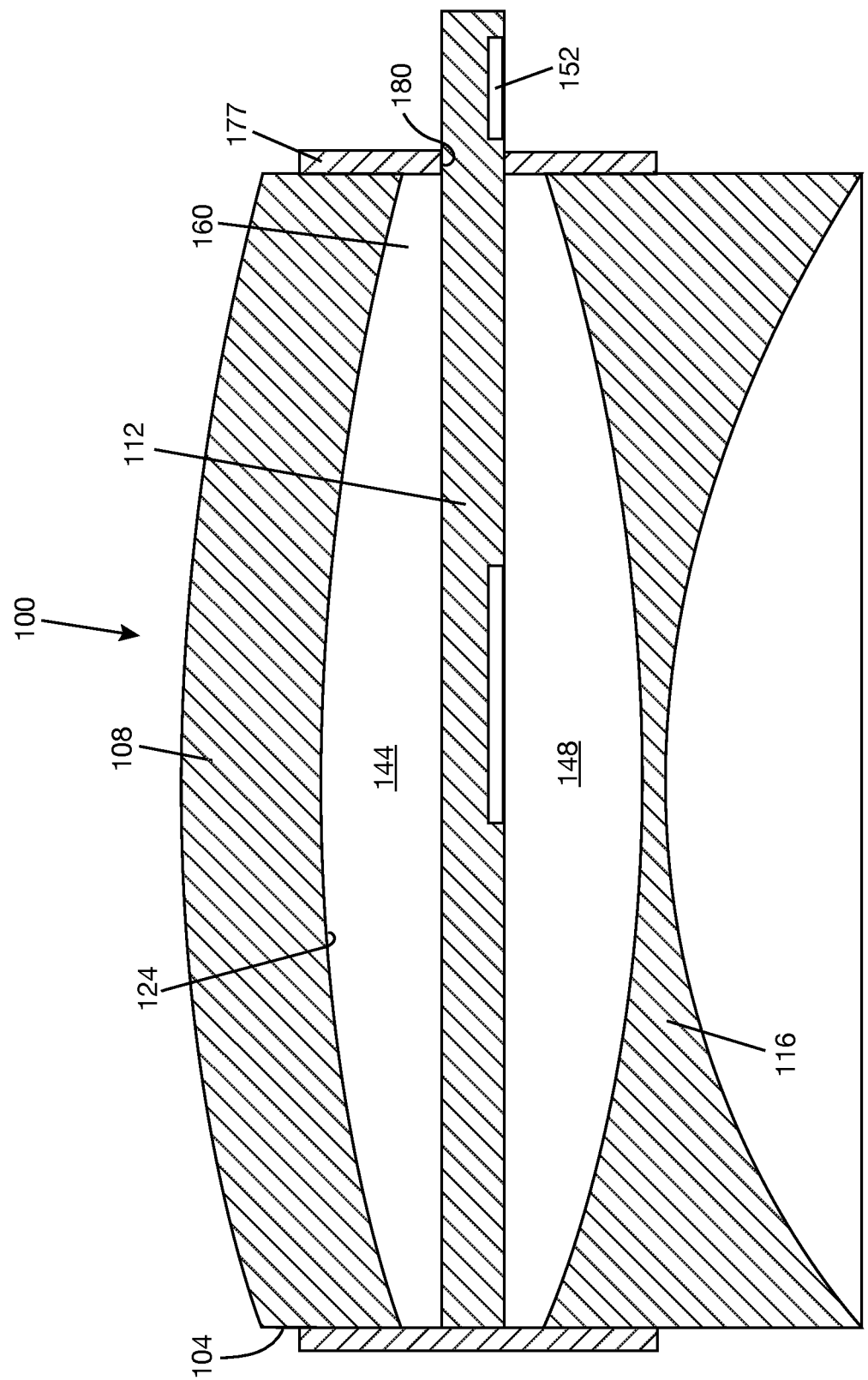
FIG. 4B is a cross-sectional view of an optical combiner lens including a sealing tape applied to a periphery of a stack of lenses and lightguide.

Other methods of securing the components in stack 104 besides adhesive layers between first lens 108 and lightguide 112 and between second lens 116 and lightguide 112 may be used. In one example, as shown in FIG. 4A, first lens 108, lightguide 112, and second lens 116 may be held together by an edge support structure 176. Edges of first lens 108, lightguide 112, and second lens 116 may be secured to edge support structure 176 by, e.g., an adhesive material. Edge support structure 176 may be in a loop form that circumscribes a periphery of stack 104 and seals medium gaps 144, 148 at the periphery of stack 104. Edge support structure 176 may also function as a spacer (or provide spacing) between first lens 108 and lightguide 112 and between lightguide 112 and second lens 116. Edge support structure 112 could be made of a transparent material, or may include an aperture (or transparent section), to allow light to travel to in-coupler 152 in the input area 112a of lightguide 112. In some cases, edge support structure 176 may be integrated as a flange to first lens 108—first lens 108 with such a flange could be formed by molding, for example. Another example is shown in FIG. 4B, where a sealing tape 177 is applied along a periphery of stack 104. Sealing tape 177 holds first lens 108, second lens 116, and lightguide 112 together while sealing medium gaps 144, 148 at the periphery of stack 104. Sealing tape 177 may include a hole 180 through which the part of lightguide 112 including in-coupler 152 may protrude. Sealing tape 177 may also function as a spacer (or provide spacing) between first lens 108 and lightguide 112 and between lightguide 112 and second lens 116.

Returning to FIG. 1A, optical combiner lens 100 provides four surfaces 120, 124, 136, 140 upon which an eyeglasses prescription may be built. Curved inner surfaces 124, 136 will affect the size of medium gaps 144, 148, which will have an effect on overall weight and size of optical combiner lens 100. For a given lightguide thickness, the radii of curvature of surfaces 120, 124, 136, 140 can be appropriately selected to achieve a desired prescription while also achieving a lens that is relatively thin and lightweight. All the lens surfaces 120, 124, 136, 140 shown in FIG. 1A have curvatures. However, it is possible for some of the surfaces, e.g., inner surfaces 124, 136, to be planar, as will be later described.

In some examples, first meniscus lens 108 can be made to have zero optical power. For an ideal meniscus lens with zero thickness, a zero optical power can be achieved by making the radii of curvature of the convex and concave surfaces of the lens equal. However, because first meniscus lens 108 does not have zero lens thickness, the radii of curvature of the surfaces 120, 124 will need to be slightly unequal to account for the effect of the lens thickness. In the example where first meniscus lens 108 has zero optical power, second lens 116 (which may be a biconcave lens or other lens type) can have negative or positive optical power, e.g., to provide a prescription function, or zero optical power. In other examples, first meniscus lens 108 may have negative or positive optical power, and second lens 116 (which may be a biconcave lens or other lens type) may have negative, positive, or zero optical power. Upper and lower bounds for negative and positive optical powers may be governed by the desired prescription to be provided by optical combiner lens 100 and/or by display performance when the optical combiner lens 100 is used with a display.

Figure 5A:
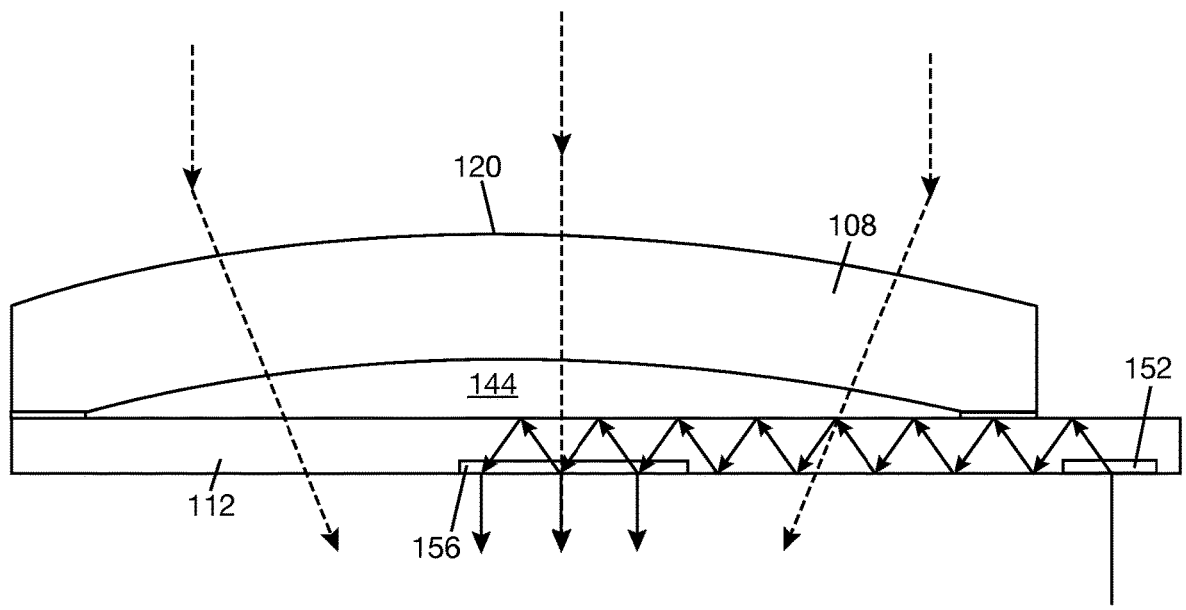
FIG. 5A is a schematic illustrating a meniscus lens with non-zero optical power and a planar lightguide, where a corrective optical power function has not been applied to the out-coupler in an output area of the planar lightguide.
Figure 5B:
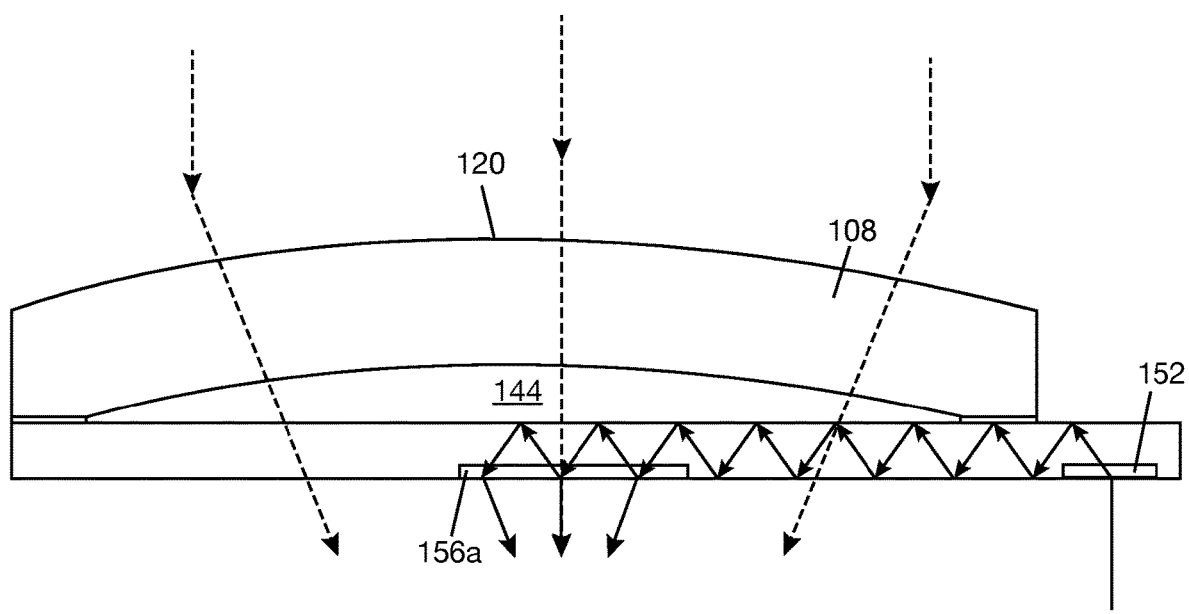
FIG. 5B is a schematic illustrating the meniscus lens and planar lightguide of FIG. 5A with a corrective optical power function applied to the out-coupler.

One potential advantage of making first meniscus lens 108 with zero optical power may be the ability to eliminate compensation for world side optical power from the design of out-coupler 156. This can be understood with reference to FIGS. 5A and 5B. FIG. 5A shows that the world-side light coming out of meniscus lens and passing through lightguide 112 is focused. At the same time, the lightguide light coming out of out-coupler 156 is collimated. A correction may be applied to out-coupler 156, as shown for out-coupler 156a in FIG. 5B, such that the lightguide light coming out of the out-coupler (156a in FIG. 5B) is aligned with the world-side light or is also focused. On the other hand, if first meniscus lens 108 is made with zero optical power, it will not be necessary for a correction to be applied to the out-coupler to compensate for differences in optical power between the world side light and the lightguide light. A meniscus lens with zero optical power will neither diverge light nor converge light. If first meniscus lens 108 has zero optical power, the second lens 116 (which may be a biconcave lens or other type of lens) is available to carry the eyeglasses prescription.

In another implementation, differences in optical power between the optical coupler 156 and first meniscus lens 108 may be useful, i.e., a "correction" may be applied to out-coupler 156 to achieve a particular optical power difference between first meniscus lens 108 and optical coupler 156 (i.e., the combined optical power of the first meniscus lens 108 and out-coupler 156 is positive or negative). For example, such difference may be exploited to place a display at a desired distance relative to the optical combiner lens or to compensate for distortions in the optical path. In general, the power of a lens to focus at a particular distance is D=1/F, where D is the optical power in diopters and F is the focal distance in meters. Theoretically, a lens having an optical power of +0.5 diopters will place a display at approximately 2 m (F=2 m). In this case, outer convex surface 120, inner concave surface 124, and out-coupler 156 form surfaces whose optical powers can be selected to achieve +0.5 diopters (or other desired optical power). As an arbitrary example, outer convex surface 120 may have an optical power of +2 diopters, inner concave surface 124 may have an optical power of −1 diopters, and optical coupler 156 may have an optical power of −0.5 diopters. If optical coupler 156 is a hologram, for example, the hologram can be recorded with the desired optical power. In general, each of outer convex surface 120 of meniscus lens 108, inner concave surface 128 of first meniscus lens 108 and out-coupler 156 can be designed with a positive, negative, or zero optical power. If the out-coupler 156 is provided with an optical power function, then there will be even more liberty in selecting the optical power of first meniscus lens 108 and second lens 116 (which may be a biconcave lens or other type of lens).

Figure 6A:
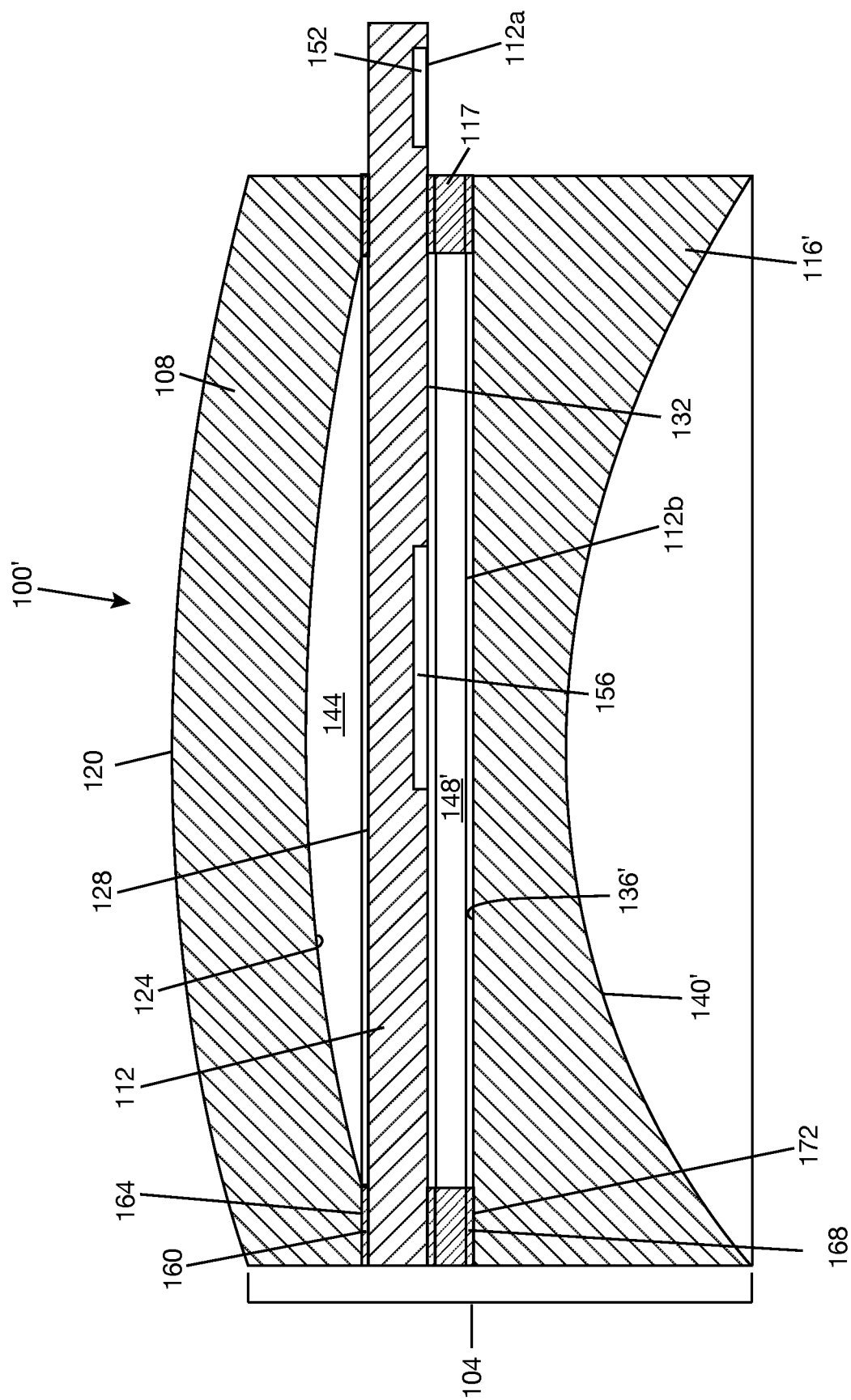
FIG. 6A is a cross-sectional view of an optical combiner lens including a planoconcave lens, a meniscus lens, and a lightguide according to another illustrative implementation.

In an alternative optical combiner lens 100' shown in FIG. 6A, a planoconcave lens 116' (instead of a biconcave lens) is used as the second lens. In this implementation, the flat or planar surface 136' of second planoconcave lens 116' is in opposing relation to the bottom lightguide surface 132, and the concave surface 140' of second planoconcave lens 116' is the eye side of the optical combiner lens. Second medium gap 148' is provided between lightguide 112 and planoconcave lens 116' by an appropriate spacer 117 between lightguide 112 and second planoconcave lens 116'—any suitable spacer structure may be used to provide the spacing between lightguide 112 and second planoconcave lens 116' that results in second medium gap 148'. The remaining features of optical combiner lens 100' are as described above for optical combiner lens 100, and reference numbers used with optical combiner lens 100 have been retained in FIG. 6A in the interest of continuity. Any of the variations in securing the lens/lightguide stack, any material selection considerations for optical combiner lens 100, and any selection of optical powers described above, and further below, apply to this alternative implementation.

Figure 6B:
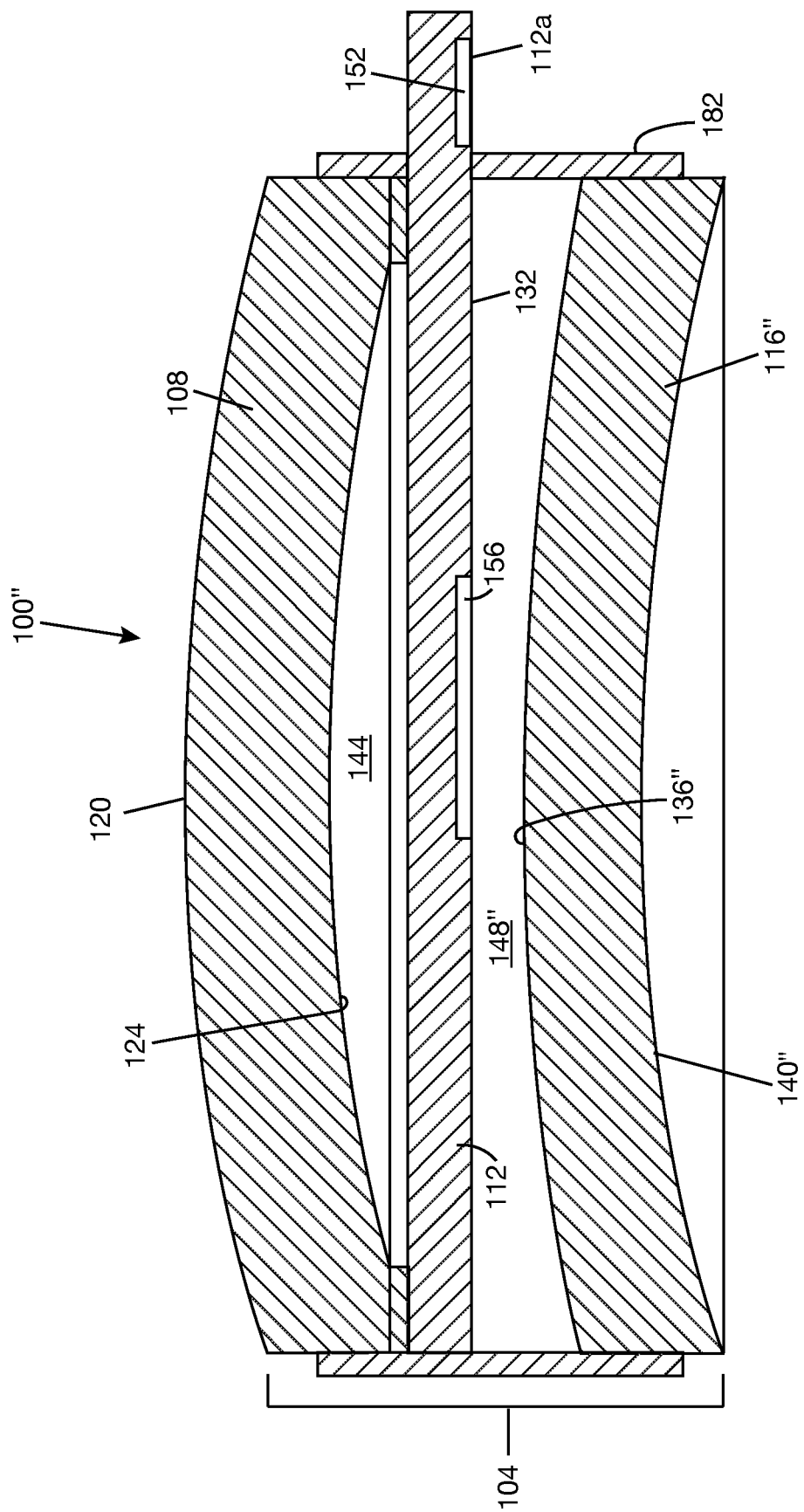
FIG. 6B is a cross-sectional view of an optical combiner lens including two meniscus lenses and a lightguide according to another illustrative implementation.

In an alternative optical combiner lens 100" shown in FIG. 6B, a meniscus lens 116" (instead of a biconcave lens or a planoconcave lens) is used as the second lens. In this implementation, the convex surface 136" of second meniscus lens 116" is in opposing relation to the bottom lightguide surface 132, and the concave surface 140" of second meniscus lens 116" is the eye side of the optical combiner lens. Second medium gap 148" is provided between lightguide 112 and meniscus lens 116" by maintaining an appropriate spacing between the lightguide 112 and second meniscus lens 116", e.g., using a lens holder 182 or other edge support structure or spacer, as described above for other implementations of the optical combiner lens. The remaining features of optical combiner lens 100" are as described above for optical combiner lens 100, and reference numbers used with optical combiner lens 100 have been retained in FIG. 6B in the interest of continuity. Any of the variations in securing the lens/lightguide stack, any material selection considerations for the optical combiner lens, and any selection of optical powers described above, and further below, apply to this alternative implementation.

Figure 7:
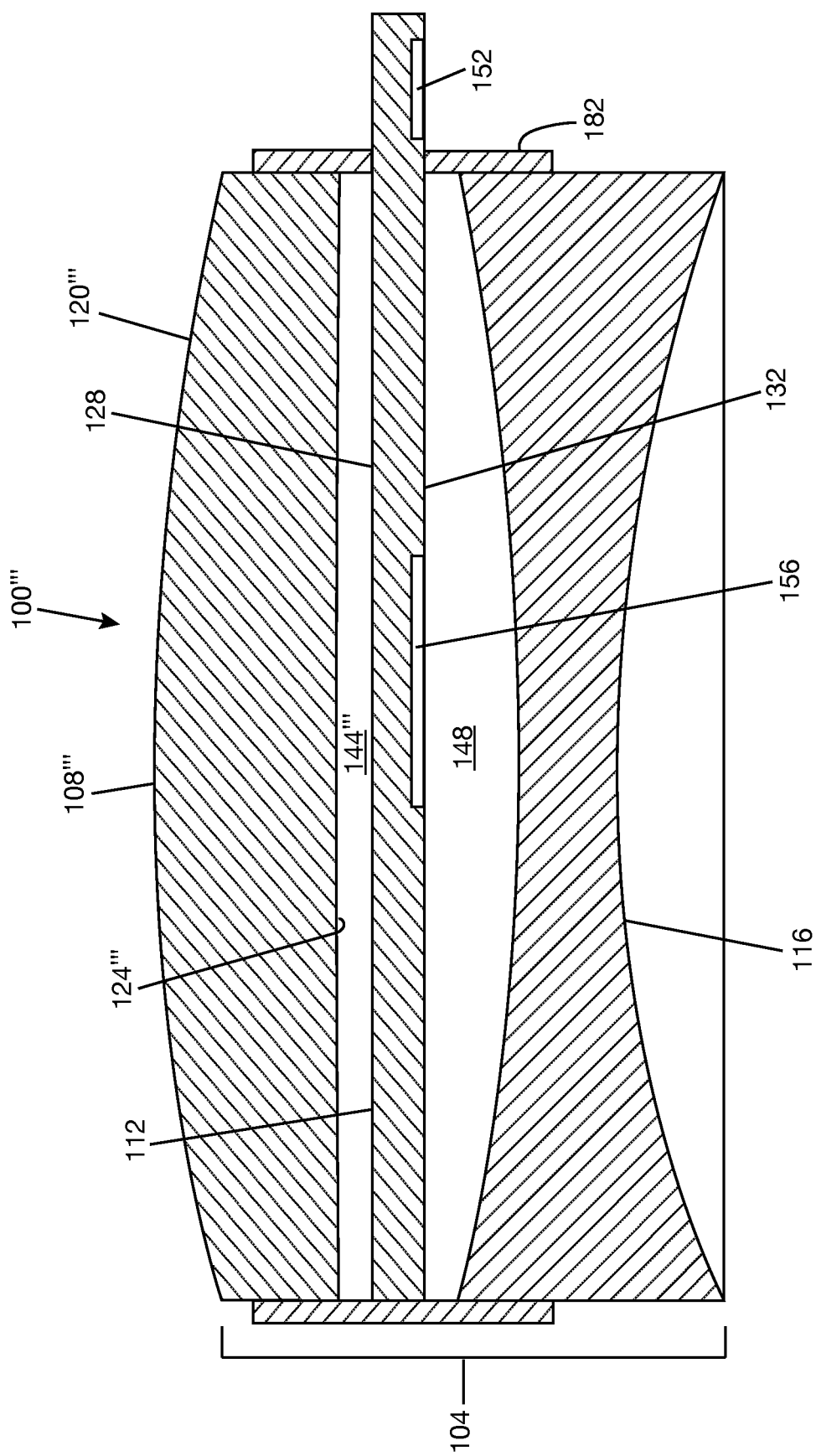
FIG. 7 is a cross-sectional view of an optical combiner lens including a planoconvex lens, a biconcave lens, and a lightguide according to another illustrative implementation.

In an alternative optical combiner lens 100''' shown in FIG. 7, a planoconvex lens 108''' (instead of a meniscus lens) is used as the first lens. First planoconvex lens 108''' has an outer convex surface 120''' and an inner planar surface 124'''. In this implementation, inner planar surface 124''' of first planoconvex lens 108''' is in opposing relation to top lightguide surface 128, and outer convex surface 120''' of first planoconvex lens 108''' is the world side of the optical combiner lens. First medium gap 144''' is provided between lightguide 112 and planoconvex lens 108''' by an appropriate spacing maintained between inner planar surface 124''' and top lightguide surface 128 using lens holder 182 or other edge support structure or spacer, as described above for other implementations of the optical combiner lens. In this example, biconcave lens 116 is used as the second lens, with medium gap 148 formed between second biconcave lens 116 and bottom lightguide surface 132. In other examples, a planoconcave lens or a meniscus lens may be used as second lens 116. The remaining features of optical combiner lens 100''' are as described above for optical combiner 100, and reference numbers used with optical combiner lens 100 have been retained in FIG. 7 in the interest of continuity. Any of the variations in securing the lens/lightguide stack, any material selection considerations of the optical combiner lens, and any selection of optical powers described above, and further below, apply to this alternative implementation.

For illustration purposes, Table 1 shows theoretical examples of prescriptions and corresponding lens surfaces, where the surfaces are noted in diopters. Example lens weights and edge thicknesses are also given, where the lenses are formed from a 60 mm lens blank with 0.7 mm edge thickness. Edge thickness would be the combined edge thicknesses of the first lens, the second lens, and the lightguide. For the examples in Table 1, first lens is a meniscus lens, second lens is a biconcave lens, lightguide is a planar lightguide, and the thickness of the lightguide is 0.5 mm. In Table 1, SPH means sphere. The examples given in Table 1 are for an arbitrary eyeglasses frame.

TABLE 1

| Prescription (SPH) | Surface 108 | Surface 124 | Surface 136 | Surface 140 | Weight (g) | Edge Thickness (mm) |
|---|---|---|---|---|---|---|
| −2.0 | +2.5 | 0 | 0 | −4.5 | 10.8 | 5.6 |
| −2.0 | +2.5 | −2.5 | 0 | −2.0 | 6.7 | 3.5 |
| −2.0 | +2.5 | −1.0 | 0 | −3.5 | 10.2 | 4.8 |
| −2.0 | +1.0 | 0 | 0 | −3.0 | 9.0 | 4.4 |
| −2.0 | +1.0 | −1.0 | 0 | −2.0 | 6.7 | 3.5 |
| −4.0 | +1.0 | 0 | 0 | −5.0 | 11.4 | 6.0 |
| −4.0 | +1.0 | −1.0 | 0 | −4.0 | 9.0 | 5.2 |
| −4.0 | +1.0 | −1.0 | −1.0 | −3.0 | 9.0 | 5.2 |
| −6.0 | +1.0 | 0 | 0 | −7.0 | 13.9 | 7.8 |
| −6.0 | +1.0 | −1.0 | 0 | −6.0 | 12.7 | 7.7 |
| −6.0 | +1.0 | −1.0 | −3.0 | −3.0 | 11.5 | 6.8 |

Figure 8:
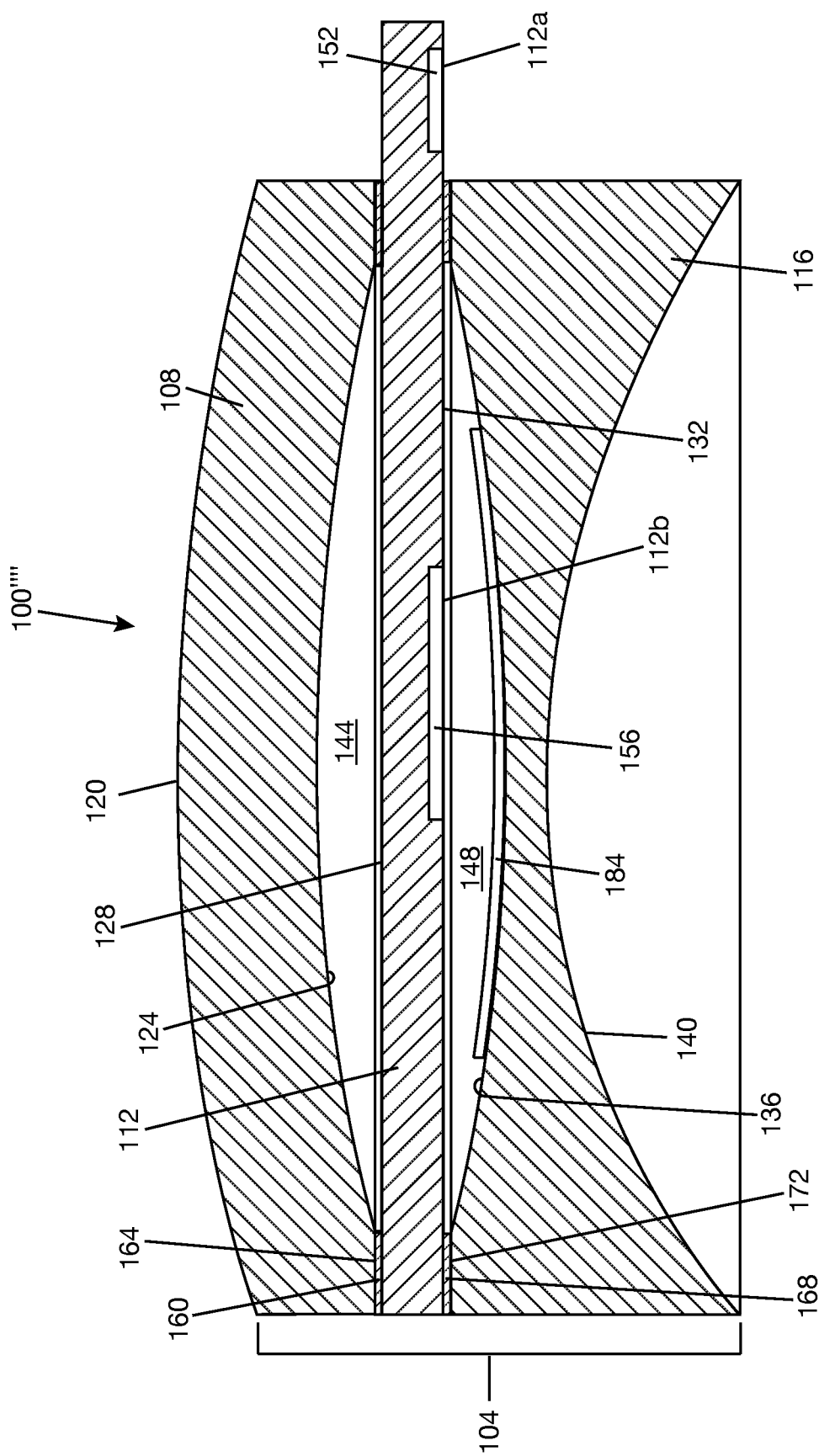
FIG. 8 is a cross-sectional view that shows a biconcave lens of the optical combiner lens of FIG. 1A carrying an infrared hologram.

In an alternative optical combiner lens 100"" shown in FIG. 8, an infrared hologram 184 is added to, or coupled to, or carried by, second biconcave lens 116, e.g., to allow use of optical combiner lens 100'" for eye tracking and/or retinal imaging using infrared light. Infrared hologram 184 redirects at least a portion of infrared light incident on the hologram, where the magnitude of the portion depends on the playback efficiency of the hologram, and transmits other light, such as visible light, generally without modifying the other light. This may also be described as the infrared hologram 184 being responsive to infrared light and unresponsive to visible light. Infrared hologram 184 may be encoded, carried, embedded in or on, or otherwise generally included in a single material of holographic material, e.g., photopolymer and/or a silver halide compound. Infrared hologram 184 may be added, e.g., by adhering, to either of the surfaces 136, 140 of second biconcave lens 116 or may even be embedded in second biconcave lens 116. Since infrared hologram 184 is not responsive to visible light, infrared hologram 184 should not have any effect on light coming out of out-coupler 156 provided the light is in the visible range, or not within the range of wavelengths to which infrared hologram 184 is responsive. Where infrared hologram 184 is a reflection hologram, infrared hologram 184 will redirect infrared light incident on the eye side of the optical combiner lens 100'", i.e., incident on the outer surface 140 of second biconcave lens 116. In optical combiner lens variations that use a planoconcave lens or a meniscus lens as second lens 116, the second planoconcave lens or second meniscus lens could carry infrared hologram 184 in the same manner described above with reference to FIG. 8. Also, first lens 108 is shown as a meniscus lens in FIG. 8 but could be a planoconvex lens in other implementations.

Figure 9A:
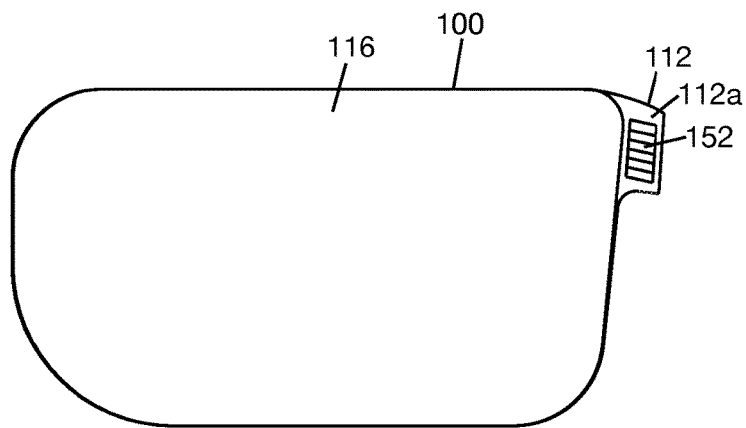
FIG. 9A is a front elevational view that shows an optical combiner lens according to any of FIGS. 1A, 4A, 4B, 6A, 6B, 7, and 8 in the shape of an eyeglass.
Figure 9B:
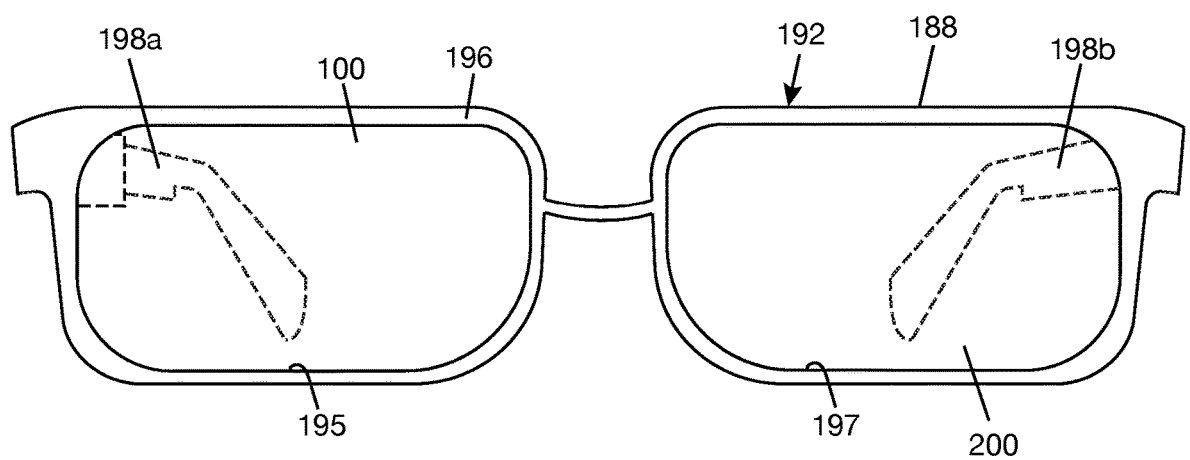
FIG. 9B is a front elevational view that shows a wearable heads-up display including the optical combiner lens of FIG. 9A.

FIG. 9A shows optical combiner lens 100 formed in the shape of an eyeglass. (Alternatively, any of the previously described optical combiner lens variations 100', 100", 100'", 100"" may be formed in the shape of an eyeglass.) FIG. 9B shows optical combiner lens 100 carried by a support structure 188 of a wearable heads-up display 192. For illustration purposes, support structure 188 is in the form of an eyeglasses frame that may be worn on a head of a subject. Support structure 188 as illustrated includes a front frame 196 and temples 198a, 198b attached to opposite sides of front frame 196. In one example, optical combiner lens 100 is fitted into a lens mount 195 in front frame 196. A second lens 200 is fitted into a lens mount 197 in front frame 196. Lens 200 may be an optical combiner lens or an ordinary eyeglass. Also, lens 200 may or may not carry an eyeglasses prescription.

Figure 9C:
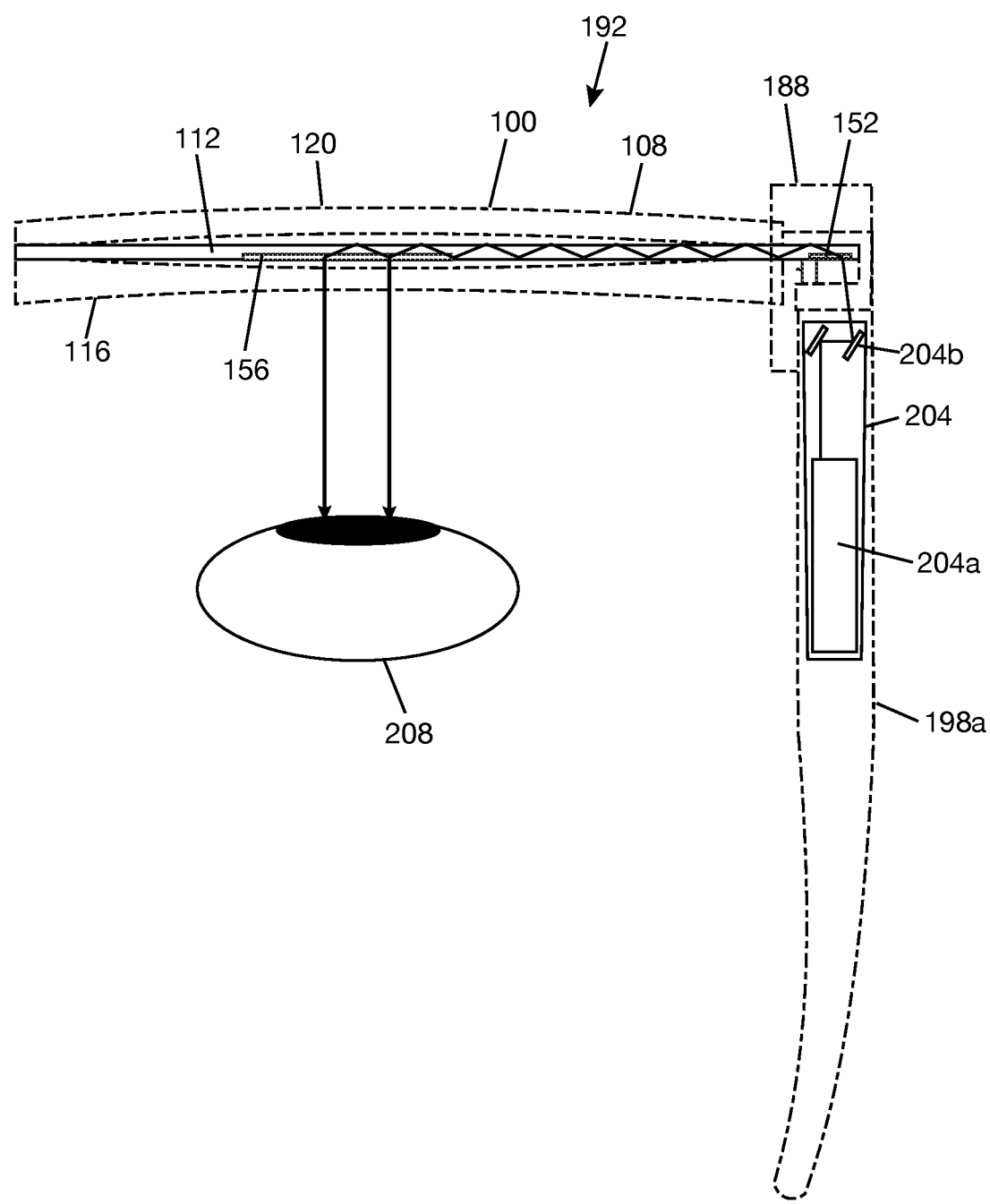
FIG. 9C is a schematic illustrating light coupled into and out of a lightguide in the optical combiner lens of FIG. 9B.

Referring to FIG. 9C, a display light source 204 (e.g., a projector, a scanning laser projector (SLP), a microdisplay, or the like) may be carried in temple 198a (also, in FIG. 9B). In the illustrated example, display light source 204 is a SLP including a light engine 204a that emits laser light and an optical scanner (e.g., scan mirror(s)) 204b to scan the laser light over a target. Display light source 204 emits light that is directed to in-coupler 152. Light from display light source 204 enters lightguide 112 through in-coupler 152, travels along lightguide 112 by TIR, and exits lightguide 112 through out-coupler 156. Light exiting through out-coupler 156 travels through second lens 116. In use, the light exiting second lens 116 enters the pupil of an eye 208 of a user wearing the wearable heads-up display, enabling the user to see a displayed image. In the setup shown in FIG. 9C, any of the other optical combiner variations described above may replace optical combiner 100.

Although not shown, additional optics may be used in between display light source 204 and input-coupler 152 and/or in between in-coupler 152 and out-coupler 156 and/or in between out-coupler 156 and the eye of the user in order to shape the display light for viewing by the eye of the user. As an example, a prism may be used to steer light from display light source 204 into in-coupler 152 so that light is coupled into in-coupler 152 at the appropriate angle to encourage propagation of the light in lightguide 112 by TIR. Also, an exit pupil expander (EPE), e.g., a fold grating, may be arranged in an intermediate stage between input-coupler 152 and out-coupler 156 to receive light that is coupled into lightguide 112 by input-coupler 152, expand the light, and redirect the light towards out-coupler 156, where out-coupler 156 then couples the light out of lightguide 112.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. An optical combiner lens, comprising:
   a first lens;
   a second lens;
   a lightguide in a stack with the first lens and the second lens, wherein a first medium gap is defined within the stack and between the first lens and the lightguide and comprises a first single cavity bounded by an inner surface of the first lens and an outer surface of the lightguide, and wherein a second medium gap is defined within the stack and between the lightguide and the second lens and comprises a second single cavity bounded by an inner surface of the second lens and an outer surface of the lightguide;
   an in-coupler positioned to receive light into the lightguide; and
   an out-coupler positioned to output light from the lightguide.

2. The optical combiner lens of claim 1, wherein the first lens is a meniscus lens, wherein the second lens is selected from the group consisting of a biconcave lens, a planoconcave lens, and a meniscus lens, and wherein the lightguide is a planar lightguide.

3. The optical combiner lens of claim 1, wherein the first lens is a planoconvex lens, and wherein the second lens is selected from a biconcave lens, a planoconcave lens, and a meniscus lens.

4. The optical combiner lens of claim 1, wherein each of the first medium gap and the second medium gap contains a respective medium having a refractive index lower than a refractive index of the lightguide.

5. The optical combiner lens of claim 1, wherein the first lens has a first lens inner surface that is convex or planar, and wherein the first medium gap is defined between the first lens inner surface and the lightguide.

6. The optical combiner lens of claim 5, further comprising an adhesive layer between the first lens and the lightguide, wherein the adhesive layer is in a form of a loop running along a periphery of the first lens inner surface and provides a hermetic seal around the first medium gap.

7. The optical combiner lens of claim 1, wherein the second lens has a second lens inner surface that is convex, planar, or concave, and wherein the second medium gap is defined between the second lens inner surface and the lightguide.

8. The optical combiner lens of claim 7, further comprising an adhesive layer between the second lens and the lightguide, wherein the adhesive layer is in a form of a loop running along a periphery of the second lens inner surface and provides a hermetic seal around the second medium gap.

9. The optical combiner lens of claim 1, further comprising an edge support structure to hold the first lens, the lightguide, and the second lens in a spaced apart relation in the stack.

10. The optical combiner lens of claim 9, wherein the edge support structure circumscribes a periphery of the stack and seals the first and second medium gaps at the periphery of the stack.

11. The optical combiner lens of claim 1, wherein the first lens is a meniscus lens and has an optical power of zero, and wherein the second lens has an optical power that is zero, positive, or negative.

12. The optical combiner lens of claim 1, wherein the first lens and the out-coupler have a combined optical power that is positive or negative, and wherein the second lens has an optical power that is zero, positive, or negative.

13. The optical combiner lens of claim 1, wherein the in-coupler is physically coupled to an input area of the lightguide that is not in registration with the first lens and the second lens.

14. The optical combiner lens of claim 1, further comprising an infrared hologram in the stack.

15. The optical combiner lens of claim 1, wherein each of the in-coupler and the out-coupler includes at least one of a hologram, a volume diffraction grating, and a surface relief grating.

16. A wearable heads-up display comprising:
   a support structure;
   a display light source coupled to the support structure;
   an optical combiner lens coupled to the support structure, the optical combiner lens comprising:
      a first lens;
      a second lens;
      a lightguide disposed between the first lens and the second lens to form a stack, wherein a first medium gap is defined within the stack and between the first lens and the lightguide and comprises a first single cavity bounded by an inner surface of the first lens and an outer surface of the lightguide, wherein a second medium gap is defined within the stack and between the lightguide and the second lens and comprises a second single cavity bounded by an inner surface of the second lens and an outer surface of the lightguide, and wherein each of the first medium gap and the second medium gap contains a respective medium having a refractive index lower than a refractive index of the lightguide;
      an in-coupler physically coupled to the lightguide and positioned to receive light from the display light source; and
      an out-coupler physically coupled to the lightguide and positioned to output light from the lightguide to the second lens.

17. The wearable heads-up display of claim 16, wherein the first lens is a meniscus lens, wherein the second lens is a biconcave lens, a planoconcave lens, or a meniscus lens, and wherein the lightguide is a planar lightguide.

18. The wearable heads-up display of claim 16, wherein the first lens is a planoconvex lens, wherein the second lens is a biconcave lens, a planoconcave lens, or a meniscus lens, and wherein the lightguide is a planar lightguide.

19. The wearable heads-up display of claim 16, further comprising an infrared hologram in the stack.

20. The wearable heads-up display of claim 16, wherein each of the first lens and out-coupler has an optical power selected to position a display from the display light source at a select focal distance, and wherein the second lens has an optical power selectively based on an eyeglasses prescription.

* * * * *